US008545325B2

(12) United States Patent  (10) Patent No.: US 8,545,325 B2
Iwamoto et al.  (45) Date of Patent: Oct. 1, 2013

(54) COMMUNICATION GAME SYSTEM

(75) Inventors: Daiki Iwamoto, Kyoto (JP); Shirou Mouri, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1369 days.

(21) Appl. No.: 11/499,656

(22) Filed: Aug. 7, 2006

(65) Prior Publication Data

US 2007/0238529 A1   Oct. 11, 2007

(30) Foreign Application Priority Data

Apr. 11, 2006   (JP) .................................. 2006-109125

(51) Int. Cl.
*A63F 9/00*     (2006.01)
*A63F 13/00*    (2006.01)
*G06F 13/00*    (2006.01)
*G06F 17/00*    (2006.01)

(52) U.S. Cl.
USPC .......................................................... 463/42

(58) Field of Classification Search
USPC .......................................... 463/37, 39, 46, 44
See application file for complete search history.

(56) References Cited

U.S. PATENT DOCUMENTS

| | | | | |
|---|---|---|---|---|
| 4,570,930 A * | 2/1986 | Matheson | ........................ | 463/41 |
| 4,958,835 A * | 9/1990 | Tashiro et al. | ................... | 463/42 |
| 5,570,113 A * | 10/1996 | Zetts | .............................. | 345/173 |
| 6,005,545 A * | 12/1999 | Nishida et al. | ................. | 345/603 |
| 6,042,477 A * | 3/2000 | Addink | ............................ | 463/42 |
| 6,363,442 B1 * | 3/2002 | Chapman | ........................ | 710/62 |
| 6,966,837 B1 * | 11/2005 | Best | ................................. | 463/33 |
| 7,862,433 B2 * | 1/2011 | Sato et al. | ........................ | 463/42 |
| 2002/0194269 A1 | 12/2002 | Owada et al. | | |
| 2003/0204565 A1 | 10/2003 | Guo et al. | | |
| 2004/0085356 A1 | 5/2004 | Kake et al. | | |
| 2005/0101383 A1 * | 5/2005 | Wells | ............................... | 463/39 |
| 2006/0106963 A1 * | 5/2006 | Sasaki et al. | ................... | 710/110 |

FOREIGN PATENT DOCUMENTS

| | | |
|---|---|---|
| JP | 2003-006127 | 1/2003 |
| JP | 2003-58912 | 2/2003 |
| JP | 2003-181143 | 7/2003 |
| JP | 2003-181146 | 7/2003 |
| JP | 2004-49922 | 2/2004 |
| WO | WO 01/25871 | 4/2001 |

OTHER PUBLICATIONS

Gamespot. "Yoshi Touch and Go Review." http://www.gamespot.com/ds/action/yoshi/review.html. Accessed Apr. 20, 2009. Created Mar. 11, 2005.*

(Continued)

*Primary Examiner* — David L Lewis
*Assistant Examiner* — Reginald Renwick
(74) *Attorney, Agent, or Firm* — Nixon & Vanderhye P.C.

(57) ABSTRACT

A communication game system includes a plurality of game apparatuses which can be communicated via a network and functions as a parent machine and as a child machine, for example. In the child machine, a moving track of an object to be operated is obtained in response to an input with a pointing device by a player, and transmitted to the parent machine. In the parent machine, a movement of the object is controlled by the moving track, and drawing information to draw a virtual game space including the moved object is transmitted to the child machine. In the child machine, a game screen including the object to be operated is generated and displayed on the basis of the received drawing information.

30 Claims, 12 Drawing Sheets

(56) References Cited

OTHER PUBLICATIONS

GameSpot. "Kirby: Canvas Curse Review." http://www.gamespot.com/ds/action/kirbycanvascurse/review.html. Accessed Apr. 20, 2009. Created Jun. 13, 2005.*

EuroGamer. "Yoshi's Touch & Go Screenshots & Images." http://www.eurogamer.net/gallery.php?game_id=4171&article_id=56894#anchor. pp. 1 and 2. Accessed Apr. 20, 2009. Created Sep. 3, 2005.*

Office Action (3 pgs.) dated Feb. 21, 2012 issued in corresponding Japanese Application No, 2006-109125.

* cited by examiner

FIG. 7
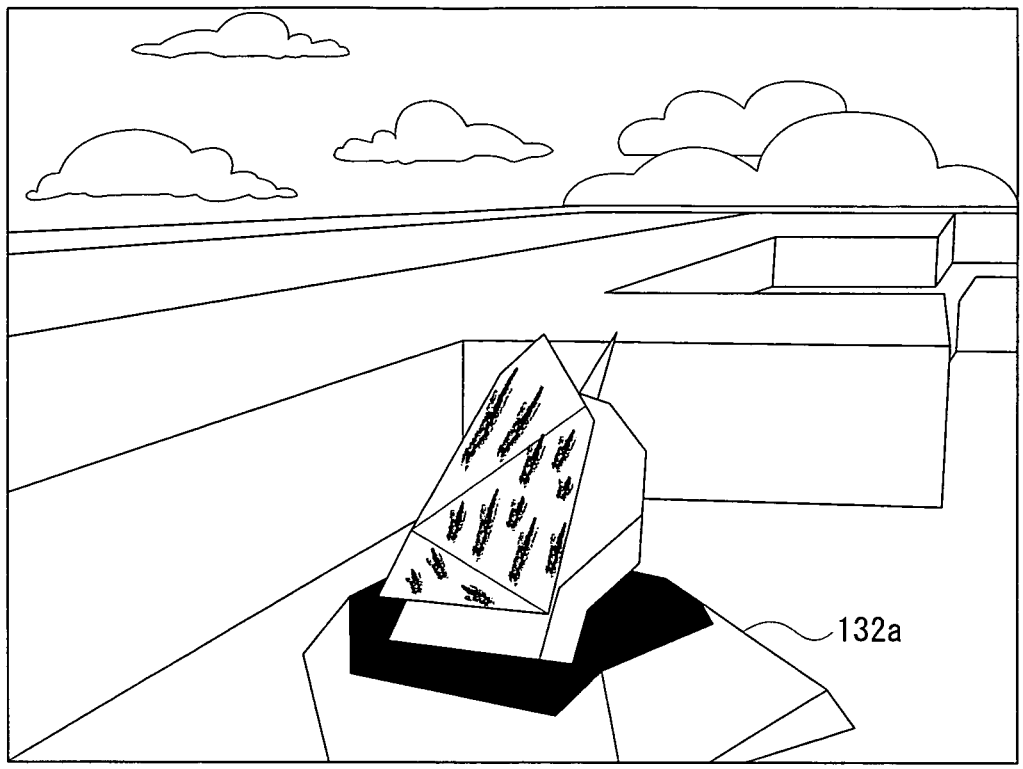
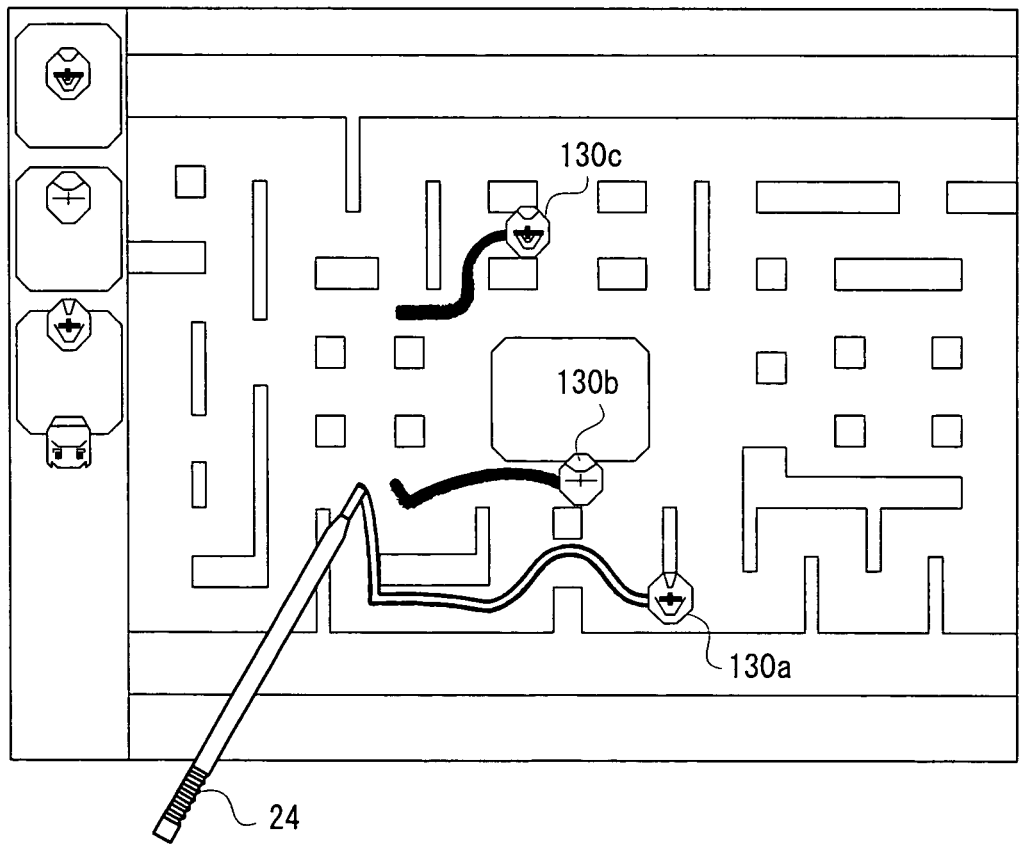

COMMUNICATION GAME SYSTEM

CROSS REFERENCE TO RELATED APPLICATION

This application claims the foreign priority of Japanese Patent Application No. 2006-109125, filed Apr. 11, 2006, which is incorporated herein by reference.

TECHNICAL FIELD

The exemplary embodiments disclosed herein relate to a communication game system. More specifically, The exemplary embodiments disclosed herein relate to a communication game system which includes a plurality of computers that can communicate with one another through a communication network, in which a communication game in which a plurality of objects appear in a virtual game space.

One example of such kind of a communication game system is disclosed in the document 1 (Japanese Patent Laying-open No. 2003-181146). The technique in the document 1 is a network game system in which a game server connects with a communication terminal via a network. In the game server, a flag indicating information of a character (object) of each terminal is managed, and only the information which is changed is transmitted to another terminal. More specifically, when an operation instruction for moving a character B is input in a terminal B, a request for movement instruction is transmitted from the terminal B to the game server. In response to the request, the game server performs a movement process of the character B, and writes information for transmitting a movement changing instruction of the character B to another terminal A to a flag table. Then, the game server transmits a movement changing instruction and position information of the character B to the terminal A. Thus, in the terminal A, the movement of the character B is displayed.

However, when a network stands between the server and the terminal or a plurality of game apparatuses, a communication delay occurs to thereby cause differences among the terminals and among the game apparatuses. For example, if a moving direction of the character is instructed by a key operation, even if a continuous input is made on the terminal, the reception of the movement instructing data is delayed due to a communication delay, and the movement of the character may be stopped on the way in the movement process of the game server. Then, such movement information different from the actual input may be transmitted to another terminal.

On the other hand, there is a communication game system in which a server or a parent machine collects operation data including a movement instruction for a character from the terminal or the child machine to perform a game process on them as a lump, and transmits all the results to a terminal or a child machine. In such a system, when the processing result data is not reached in time for the display timing from the server or the parent machine due to the communication delay, it is difficult for the terminal or the child machine to continue to move the character, and in the terminal or the child machine, the character may stop moving unlikely to the actual input.

Therefore, it is an aspect of certain exemplary embodiments to provide a novel communication game system, game apparatus, management computer, storage medium storing a game program, and communication game control method.

Another aspect of certain exemplary embodiments is to provide a communication game system, a game apparatus, a management computer, a storage medium storing a game program, and a communication game control method which can control the movement of an object without making a player sense a communication delay.

A communication game system of a first exemplary embodiment is a communication game system including a management computer which controls movements of a plurality of objects appearing in a virtual game space and a game apparatus which is communicably connected with the management computer and has an operating means causing a player to operate at least one object out of the plurality of objects as an object to be operated. The game apparatus includes a track obtaining means and a track transmitting means. The track obtaining means obtains a moving track of the object to be operated input by the operating means. The track transmitting means transmits the moving track obtained by the track obtaining means to the management computer. The management computer comprises a track receiving means, a movement controlling means, and a drawing information transmitting means. The track receiving means receives the moving track from the track transmitting means. The movement controlling means controls a movement of the object to be operated in the virtual game space by the moving track received by the track receiving means. The drawing information transmitting means transmits to the game apparatus drawing information to draw the virtual game space including the object moved by the movement controlling means. The game apparatus further comprises a drawing information receiving means and a screen display means. The drawing information receiving means receives the drawing information from the drawing information transmitting means. The screen display means generates and displays a game screen including the object to be operated by the drawing information received by the drawing information receiving means.

More specifically, the communication game system (200: reference numeral designating a portion corresponding in the exemplary embodiments described later.) includes a management computer (10) and a game apparatus (10). In the communication game system, a communication game in which a plurality of objects appear in a virtual game space is executed. The player of the game apparatus operates at least one object out of a plurality of objects (132) by an operating means (22). The movements of the plurality of objects are managed by the management computer. The management computer may be a server, for example, to be connected with a game apparatus via a network (202). Or, if the communication game system includes not the server but a plurality of game apparatuses, any one of the game apparatuses may function as a management computer, that is, a parent machine. A track obtaining means (42, 54, 74, 88, S99) of the game apparatus obtains a moving track of the object to be operated input by the operating means. For example, the operating means is a touch panel, and a route through which the object to be operated of the game apparatus intends to move is obtained on the basis of a plurality of coordinates which are continuously detected on the touch panel. A track transmitting means (42, 64, 90, S91, S103, S113) transmits the moving track to the management computer. In response thereto, a track receiving means (42, 64, 80, S7, S9) of the management computer receives the moving track. A movement controlling means (42, 82, S11) controls by the received moving track a movement of the object to be operated of the game apparatus which has transmitted the track. Thus, the object moves along the moving track in the virtual game space. The drawing information transmitting means (42, 64, 84, S15) transmits to the game apparatus drawing information to draw the virtual game space including the moved object. The drawing information includes information relating to a position, orientation and motion of an object appearing in the game space, for example. In response thereto, a drawing information receiving means (42, 64, 92, S117, S119) of the game apparatus receives the drawing information from the parent machine. The screen display means (42, 50, 52, 60, 76, S135) generates and displays a game screen including the object to be operated by the received drawing information. This makes it possible to display an object moving along the input moving track.

Thus, the moving track of the object is obtained from a game apparatus while the management computer controls the movement of the object. That is, a route through which the object intends to move is obtained in advance, and therefore, it is possible to advance the movement of the object even at the occurrence of a communication delay, and it is possible to control the movement of the object without making the player feel a communication delay.

In one exemplary embodiment, the track transmitting means further transmits input end information when the input of the moving track from the operating means ceases, and the movement controlling means starts a movement of the object on the condition that the input end information is received.

That is, a track transmitting means (S109-S113) of the game apparatus further transmits input end information to the management computer when it is determined that the input of the moving track from the operating means ceases. A movement controlling means (S45, S49, S65, S71) of the management computer starts a movement of the object on the condition that the input end information is received. Accordingly, after all of the input moving tracks are obtained in the game apparatus, the object starts to be moved in the management computer, preventing the movement of the object from being suspended due to a communication delay.

In another exemplary embodiment, track obtaining means does not accept the input of the moving track when the number of points on the moving track is equal to or more than a first threshold value.

That is, the track obtaining means does not accept the input of the moving track when it is determined that the number of points on the moving track is equal to or more than predetermined first threshold value (S97). Thus, in this exemplary embodiment, the length of an inputable moving track is limited by setting an upper limit in the number of points obtained as the moving track, and therefore, the movable distance by one input can be restricted in an appropriate range.

In the other exemplary embodiment, the track transmitting means sequentially transmits the moving track every time that a length of the moving track is equal to or more than a second threshold value during obtainment by the track obtaining means.

That is, every time that it is determined that a length of the moving track is equal to or more than a second threshold value during obtainment of the moving track (S101), the moving track is sequentially transmitted to the management computer by the track transmitting means. Thus, a moving track is sequentially transmitted every constant length, and therefore, it is possible to reduce amount of data to be transmitted at a time.

In a further exemplary embodiment, the track obtaining means cleared the obtained moving track of the object when a no-input state to the object to be operated is shifted to an input state thereto.

That is, the track obtaining means (S83-S89) clears the moving track of the object obtained in the past when it is determined that an input of the moving track is started with respect to the object to be operated. That is, in the game apparatus, as to the object to be operated, the obtained moving track information can be stored until a next input of the moving track is started, and therefore, it is possible to perform a game process (a position prediction when the drawing information is not received, for example) on the basis of the moving track information as necessary.

In another exemplary embodiment, the track transmitting means further transmits clear information of the moving track of the object when a no-input state to the object to be operated is shifted to an input state thereto, and the movement controlling means clears the received moving track of the object when the clear information of the moving track of the object is received.

That is, a track transmitting means (S83-S87, S91) transmits the clear information of the moving track of the object to the management computer when it is determined that a moving track is started to be input to the object to be operated. The movement controlling means (S31-S35) of the management computer clears the received moving track of the object when the above-described clear information is received. Thus, in the management computer, when a next input of the moving track is started in the game apparatus, the received moving track is cleared, and therefore, if the movement based on the received moving track is being executed, the movement can be stopped.

In the other exemplary embodiment, the track obtaining means specifies an object selected as the object to be operated out of the plurality of objects, and obtains a moving track of the object.

Thus, the moving track for each object selected as the object to be operated can be obtained by the track obtaining means (S85, S87, S99), and this makes it possible for the player of the game apparatus to operate the plurality of characters by the moving track input.

In a further exemplary embodiment, the operating means is a pointing device, and the track obtaining means obtains a plurality of coordinates continuously detected from the input by the pointing device as the moving track.

More specifically, in the game apparatus, pointing devices such as a touch panel, etc. are adopted as an operating means, and a plurality of coordinates continuously detected from the input by the pointing device are obtained as a moving track. Thus, the player can input the moving track of the object by a continuous instruction of the coordinates with the pointing device, capable of operating the movement of the object with an intuitive operation.

In another exemplary embodiment, the management computer further includes an action instructing means for instructing an action of an object to be operated of the management computer by a player, and the movement controlling means controls the movement of the object to be operated of the management computer on the basis of a movement instruction by the action instructing means.

More specifically, the management computer further includes an action instructing means (20). The management computer in this case is a game apparatus functioning as a parent machine, and an object (134) operated by the player of the parent machine appears together with an object of the game apparatus functioning as a child machine in the virtual game space. The movement of the object to be operated by a parent machine is controlled on the basis of a movement instruction by the action instructing means by the player of the parent machine (S3, S5). Accordingly, the object of the child machine is moved along the moving track while the object of the parent machine can be moved in real time according to the action instruction, thus, it is possible to realize a communication game capable of avoiding an adversely effect of a communication delay, and being high in interest and strategy.

In another exemplary embodiment, the game apparatus further includes a predicting means for predicting at least a position of the object to be operated on the basis of the moving track obtained by the track obtaining means when the drawing information from the drawing information transmitting means is not received for a definite period of time.

That is, the predicting means (S125-S131) of the game apparatus predict at least the position of the object to be operated of the game apparatus on the basis of the moving track when the drawing information is not received for a definite period of time. Therefore, even if the reception of the drawing information is delayed, it is possible to precisely predict a next position of the object to be operated on the basis of the stored moving track in the game apparatus. In addition, when the drawing information is received after the prediction, and even if the position modification is performed, high accuracy of the predicted position allows the object to smoothly move.

A game apparatus of a second exemplary embodiment is a game apparatus which is communicably connected with a management computer managing movements of a plurality of objects appearing in a virtual game space in a communication game system. The game apparatus comprises an operating means, a track obtaining means, a track transmitting means, a drawing information receiving means, and a screen display means. The operating means causes a player to operate at least one object among the plurality of objects as an object to be operated. The track obtaining means obtains a moving track of the object to be operated input by the operating means. The track transmitting means transmits the moving track obtained by the track obtaining means to the management computer. The drawing information receiving means receives from the management computer drawing information to draw the virtual game space including the object moved by the moving track. The screen display means generates and displays a game screen including the object to be operated by the drawing information received by the drawing information receiving means.

The second exemplary embodiment is the game apparatus applied to the communication game system of the first exemplary embodiment, and can realize a communication game which can move an object without making the player feel a communication delay similarly to the first exemplary embodiment.

A storage medium storing a game program of a third exemplary embodiment is a storage medium storing a game program of a game apparatus which is communicably connected with a management computer managing movements of a plurality of objects appearing in a virtual game space in a communication game system, and has an operating means causing a player to operate at least one object among the plurality of objects as an object to be operated. The game program of the storage medium makes the game apparatus function as a track obtaining means, a track transmitting means, a drawing information receiving means, and a screen display means. The track obtaining means obtains a moving track of the object to be operated input by the operating means. The track transmitting means transmits the moving track obtained by the track obtaining means to the management computer. The drawing information receiving means receives drawing information to draw the virtual game space including the object moved by the moving track from the management computer. The screen display means generates and displays a game screen including the object to be operated by the drawing information received by the drawing information receiving means.

The third exemplary embodiment is the storage medium storing a game program of the game apparatus of the second exemplary embodiment applied in the communication game system of the first exemplary embodiment, and has an advantage similarly to that in the second exemplary embodiment.

A management computer of a fourth exemplary embodiment is a management computer which is communicably connected with a game apparatus having an operating means causing a player to operate at least one object among a plurality of objects appearing in a virtual game space as an object to be operated in a communication game system, and manages movements of the plurality of objects. The management computer comprises a track receiving means, a movement controlling means, and a drawing information transmitting means. The track receiving means receives a moving track of the object which is obtained and transmitted by the operating means of the game apparatus. The movement controlling means controls a movement of the object to be operated in the virtual game space by the moving track received by the track receiving means. The drawing information transmitting means transmits drawing information to draw the virtual game space including the object moved by the movement controlling means to the game apparatus.

The fourth exemplary embodiment is the management computer applied in the communication game system in the first exemplary embodiment, and can realize a communication game capable of moving an object without making the player feel a communication delay similarly to the first exemplary embodiment.

A storage medium storing a game program of a fifth exemplary embodiment is a storage medium storing a game program of a management computer which is communicably connected with a game apparatus having an operating means causing a player to operate at least one object among a plurality of objects appearing in a virtual game space as an object to be operated in a communication game system, and manages movements of the plurality of objects. The game program of the storage medium causes the management computer to function as a track receiving means, a movement controlling means, and a drawing information transmitting means. The track receiving means receives a moving track of the object which is obtained and transmitted by the operating means of the game apparatus. The movement controlling means controls a movement of the object to be operated in the virtual game space by the moving track received by the track receiving means. The drawing information transmitting means transmits drawing information to draw the virtual game space including the object moved by the movement controlling means to the game apparatus.

The fifth exemplary embodiment is the storage medium storing a game program of the management computer of the fourth exemplary embodiment to be applied in the communication game system of the first exemplary embodiment, and has an advantage similarly to that in the fourth exemplary embodiment.

A storage medium storing a game program of a sixth exemplary embodiment is a storage medium storing a game program for a communication game system including a plurality of game apparatuses which function as a parent machine managing movements of a plurality of objects appearing in a virtual game space and as a child machine having an operating means to cause a player to operate at least one object among the plurality of objects as an object to be operated. The game program of the storage medium causes the game apparatus working as a child machine to function as a track obtaining means, a track transmitting means, a drawing information receiving means, and screen display means. The track obtaining means obtains a moving track of the object to be operated input by the operating means. The track transmitting means transmits the moving track obtained by the track obtaining means to the parent machine. The drawing information receiving means receives from the parent machine drawing information to draw the virtual game space including the object moved by the moving track. The screen display means generates and displays a game screen including the object to be operated by the drawing information received by the drawing information receiving means. In addition, the game program causes the game apparatus working as a parent machine to function as a track receiving means, a movement controlling means, and a drawing information transmitting means. The track receiving means receives the moving track of the object transmitted from the child machine. The movement controlling means controls a movement of the object to be operated in the virtual game space by the moving track received by the track receiving means. The drawing information transmitting means transmits to the child machine drawing information to draw the virtual game space including the object moved by the movement controlling means.

The sixth exemplary embodiment is a storage medium storing a game program for realizing the communication game system of the first exemplary embodiment by the plurality of game apparatuses, and is applied to each of the plurality of game apparatuses to make a game apparatus function as a parent machine and a child machine. According to the sixth exemplary embodiment, similarly to the above-described first exemplary embodiment, the movement of the object can be controlled without making the player feel a communication delay.

A communication game control method of a seventh exemplary embodiment is a communication game control method of a game apparatus which is communicably connected with a management computer managing movements of a plurality of objects appearing in a virtual game space in a communication game system, and has an operating means causing a player to operate at least one object out of the plurality of objects as an object to be operated. The communication game control method includes a track obtaining step, a track transmitting step, a drawing information receiving step, and a screen display step. The track obtaining step obtains a moving track of the object to be operated input by the operating means. The track transmitting step transmits the moving track obtained by the track obtaining step to the management computer. The drawing information receiving step receives drawing information to draw the virtual game space including the object moved by the moving track from the management computer. The screen display step generates and displays a game screen including the object to be operated by the drawing information received by the drawing information receiving means.

The seventh exemplary embodiment is a communication game control method corresponding to the second and third exemplary embodiments, and has an advantage similar to that in the above-described second and third exemplary embodiment.

A communication game control method of a eighth exemplary embodiment is a communication game control method of a management computer which is communicably connected with a game apparatus having an operating means causing a player to operate at least one object among a plurality of objects appearing in a virtual game space as an object to be operated in a communication game system, and manages movements of the plurality of objects. The communication game control method includes a track receiving step, a movement controlling step, and a drawing information transmitting step. The track receiving step receives a moving track of the object which is obtained and transmitted by the operating means of the game apparatus. The movement controlling step controls a movement of the object to be operated in the virtual game space by the moving track received by the track receiving step. The drawing information transmitting step transmits drawing information to draw the virtual game space including the object moved by the movement controlling step to the game apparatus.

The eighth exemplary embodiment is a communication game control method corresponding to the fourth and fifth exemplary embodiment, and has an advantage similar to that in the above-described the fourth and fifth exemplary embodiment.

A communication game control method of a ninth exemplary embodiment is a communication game control method of a game apparatus in a communication game system including a plurality of game apparatuses which function as a parent machine managing movements of a plurality of objects appearing in a virtual game space and as a child machine having an operating means to cause a player to operate at least one object among the plurality of objects as an object to be operated. The communication game control method includes a track obtaining step, a track transmitting step, a drawing information receiving step, and a screen display step if the game apparatus works as a child machine, and includes a track receiving step, a movement controlling step, and a drawing information transmitting step if the game apparatus works as a parent machine. The track obtaining step obtains a moving track of the object to be operated input by the operating means. The track transmitting step transmits the moving track obtained by the track obtaining step to the parent machine. The drawing information receiving step receives from the parent machine drawing information to draw the virtual game space including the object moved by the moving track. The screen display step generates and displays a game screen including the object to be operated on the basis of the drawing information received by the drawing information receiving step. The track receiving step receives the moving track of the object transmitted from the child machine. The movement controlling step controls a movement of the object to be operated in the virtual game space by the moving track received by the track receiving step. The drawing information transmitting step transmits to the child machine drawing information to draw the virtual game space including the object moved by the movement controlling step.

The ninth exemplary embodiment is a communication game control method corresponding to the first and sixth exemplary embodiments, and has an advantage similarly to that in the above-described first and sixth exemplary embodiments.

According to certain exemplary embodiments, a movement instruction information of the object by a player is obtained as a moving track in the game apparatus or the child machine while the movement of the object is controlled by the moving track in the management computer or the parent machine, and therefore, even if a communication delay occurs, the object can continues to move, capable of preventing the movement of the object from being suspended during the movement. Thus, it is possible to progress the game by moving an object without making the player feel a communication delay.

The above described features, aspects and advantages of certain exemplary embodiments will become more apparent

BRIEF DESCRIPTION OF THE DRAWINGS

FIG. 7 is an illustrative view showing one example of a game screen displayed when a moving track is input to a child machine;

DETAILED DESCRIPTION

Figure 1:
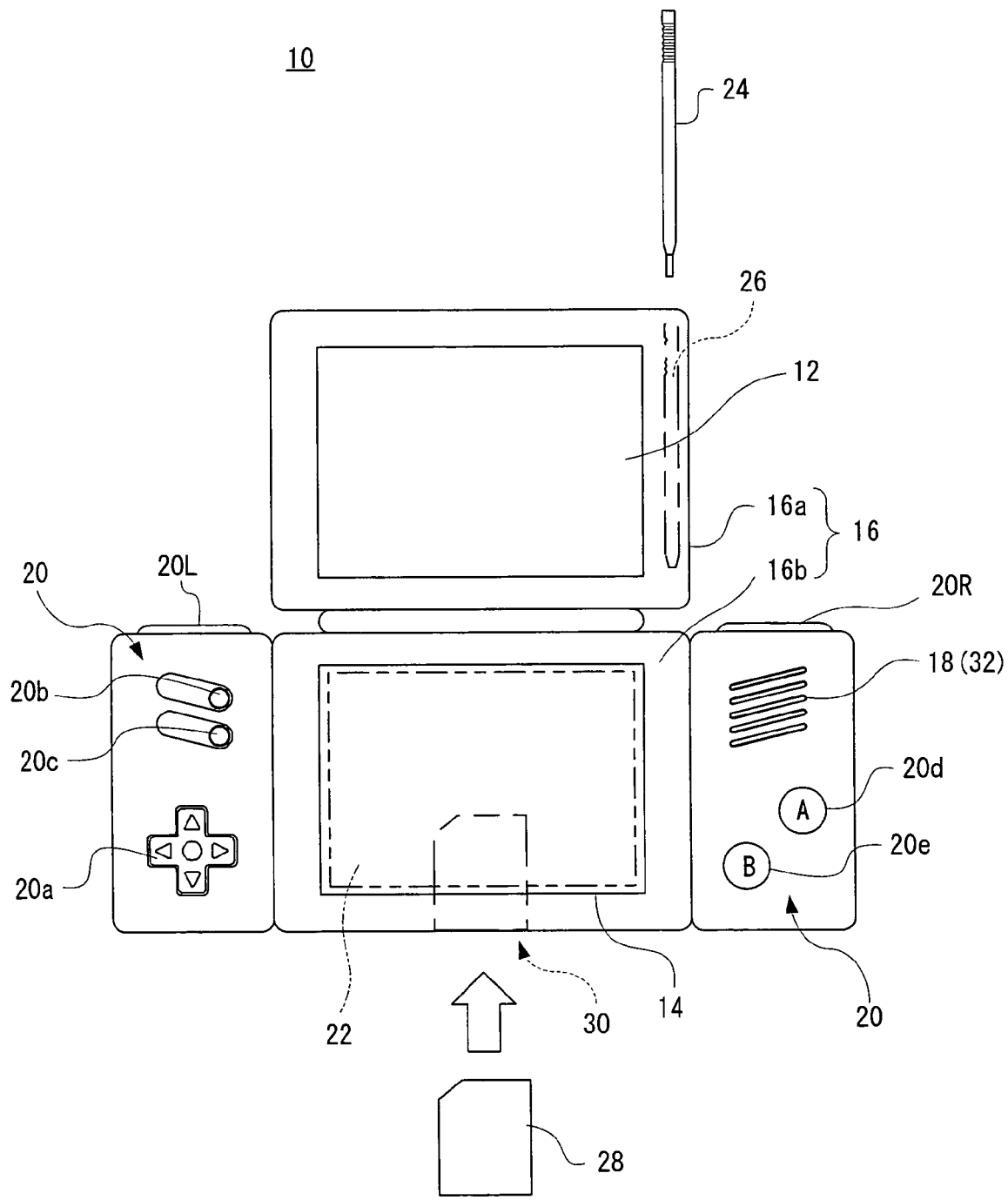
FIG. 1 is an appearance view showing one example of a game apparatus of one exemplary embodiment.

Referring to FIG. 1, a game apparatus 10 of one exemplary embodiment includes a first liquid crystal display (LCD) 12 and a second LCD 14. The LCD 12 and the LCD 14 are provided on a housing 16 so as to be arranged in a predetermined position in the housing. In this exemplary embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It should be noted that although the LCD is utilized as a display in this exemplary embodiment, an EL (Electronic Luminescence) display and a plasma display may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound release hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

The operating switch 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed in a part of an upper edge (top surface) of the lower housing 16b at a place except for a connected portion with the upper housing 16a, and lie of each side of the connected portion.

The direction instructing switch 20a functions as a digital joystick, and is utilized for instructing a moving direction of a player character (or player object) to be operated by a player and a cursor, and so forth by operating any one of four depression portions. The start switch 20b is formed by a push button, and is utilized for starting (restarting), temporarily stopping a game, and so forth. The select switch 20c is formed by the push button, and utilized for a game mode selection, etc.

The action switch 20d, that is, the A button is formed by the push button, and allows the player character to perform an arbitrary movement (action), except for instructing the direction, such as hitting (punching), throwing, holding (obtaining), riding, jumping, cutting, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 20e, that is, the B button is formed by the push button, and is utilized for changing a game mode selected by the select switch 20c, canceling an action determined by the A button 20d, and so forth.

The action switch (L button) 20L and the action switch 20 R (R button) are formed by the push button, and the L button 20L and the R button 20R can perform the same operation as the A button 20d and the B button 20e, and also function as a subsidiary of the A button 20d and the B button 20e.

Also, on a top surface of the LCD 14, a touch panel 22 is provided. As the touch panel 22, any one of kinds of a resistance film system, an optical system (infrared rays system) and an electrostatic capacitive coupling system, for example, can be utilized. In response to an operation by depressing, stroking, touching, hitting, and so forth with a stick 24, a pen (stylus pen), or a finger (hereinafter, referred to as "stick 24, etc.") on a top surface of the touch panel 22, the touch panel 22 detects a coordinates position operated by the stick 24, etc. (that is, touched) to output coordinates data corresponding to the detected coordinates.

It should be noted that in this exemplary embodiment, a resolution of the display surface of the LCD 14 is 256 dots× 192 dots, and a detection accuracy of the touch panel 22 (operation surface) is also rendered 256 dots×192 dots in correspondence to the display surface (this is true for the LCD 12). However, in FIG. 1, in order to simply represent the touch panel 22, the touch panel 22 is displayed different from the LCD 14 in size, but the display screen of the LCD 14 and the operation screen of the touch panel 22 are the same in size. It should be noted that the detection accuracy of the touch panel 22 may be lower than the resolution of the display surface, or higher than it.

Different game screens may be displayed on the LCD 12 and the LCD 14. Furthermore, by utilizing the two LCD 12 and LCD 14 as one screen, it is possible to display a large monster (enemy character) to be defeated by the player character. Accordingly, the player is able to point a character image such as a player character, an enemy character, an item character, texture information, an icon, etc. to be displayed on the LCD 14 and select commands by operating the touch panel 22 with the use of the stick 24, etc. It should be noted that depending on the kind of the game, the player is able to use the LCD 14 for other various input instructions, such as selecting or operating the icon displayed on the LCD 14, instructing a coordinates input, and so forth.

Thus, the game apparatus 10 has the LCD 12 and the LCD 14 as a display portion of two screens, and by providing the touch panel 22 on an upper surface of any one of them (LCD 14 in this exemplary embodiment), the game apparatus 10 has the two screens (12, 14) and the operating portions (20, 22) of two systems.

Furthermore, in this exemplary embodiment, the stick 24 can be inserted into a housing portion (housing slot) 26 provided in proximity to a side surface (right side surface) of the upper housing 16a, for example, and taken out therefrom as necessary. It should be noted that in a case of preparing no stick 24, it is not necessary to provide the housing portion 26.

Also, the game apparatus 10 includes a memory card (or game cartridge) 28. The memory card 28 is detachable, and inserted into a loading slot 30 provided on a rear surface or a lower edge (bottom surface) of the lower housing 16b. Although omitted in FIG. 1, a connector 46 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 2) of the game apparatus 10.

It should be noted that although not illustrated in FIG. 1, a speaker 32 (see FIG. 2) is provided at a position corresponding to the sound release hole 18 inside the lower housing 16b.

Furthermore although omitted in FIG. 1, for example, a battery accommodating box is provided on a rear surface of the lower housing 16b, and a power switch, a volume switch, an external expansion connector, an earphone jack, etc. are provided on a bottom surface of the lower housing 16b.

Figure 2:
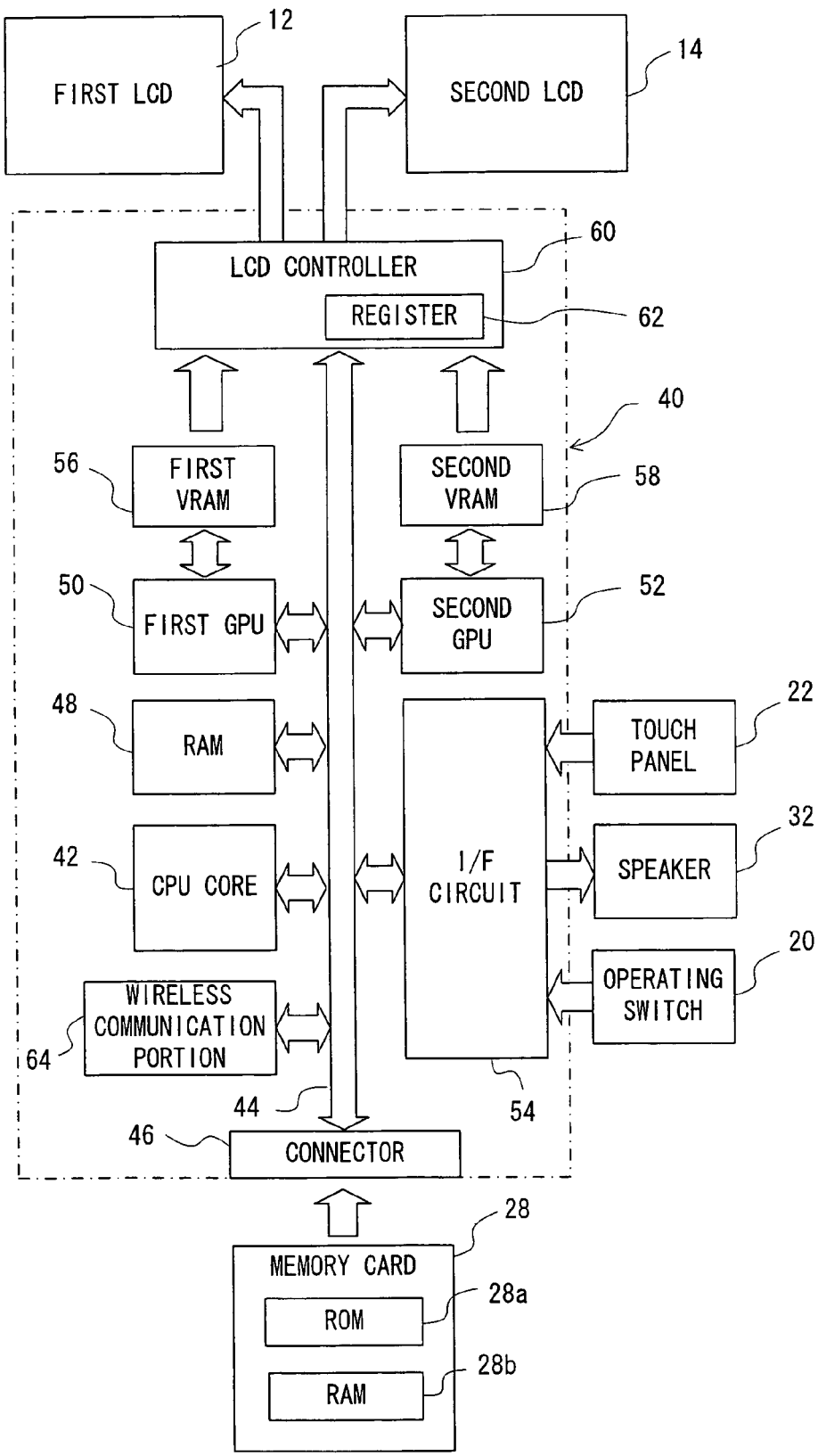
FIG. 2 is a block diagram showing one example of an electric configuration of FIG. 1 exemplary embodiment.

FIG. 2 is a block diagram showing an electrical configuration of the game apparatus 10. Referring to FIG. 2, the game apparatus 10 includes an electronic circuit board 40, and on the electronic circuit board 40, a circuit component such as a CPU core 42, etc. is mounted. The CPU core 42 is connected to the connector 46 via a bus 44, and is connected with a RAM 48, a first graphics processing unit (GPU) 50, a second GPU 52, and an input-output interface circuit (hereinafter, referred to as "I/F circuit") 54, an LCD controller 60, and a wireless communication portion 64.

The connector 46 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 46. Accordingly, the CPU core 42 gains access to the ROM 28a and the RAM 28b as described above.

The ROM 28a stores in advance a game program for a game (virtual game) to be executed by the game apparatus 10, image data (character image, background image, item image, icon (button) image, message image, etc.), data of the sound (music) necessary for the game (sound data), etc. The RAM (backup RAM) 28b stores (saves) proceeding data and result data of the game.

The RAM 48 is utilized as a buffer memory or a working memory. That is, the CPU core 42 loads the game program, the image data, the sound data, etc. stored in the ROM 28a of the memory card 28 into the RAM 48, and executes the loaded game program. The CPU core 42 executes a game process while storing data (game data, flag data, etc.) generated or obtained in correspondence with a progress of the game in the RAM 48.

It should be noted that the game program, the image data, the sound data, etc. are loaded from the ROM 28a entirely at a time, or partially and sequentially as necessary so as to be stored into the RAM 48. However, like this exemplary embodiment, if the game apparatus 10 is able to directly connect a storage medium fixedly storing a program and data to the CPU core 42, the CPU core 42 can directly access the storage medium, and therefore, there is no need to transfer the program and the data to the RAM 48 so as to be held.

Each of the GPU 50 and the GPU 52 forms a part of a rendering means, is constructed by a single chip ASIC, for example, and receives a graphics command (construction command) from the CPU core 42 to generate game image data according to the graphics command. It should be noted that the CPU core 42 applies an image generation program (included in the game program) to both of the GPU 50 and GPU 52.

Furthermore, the GPU 50 is connected with a first video RAM (hereinafter, referred to as "VRAM") 56, and the GPU 52 is connected with a second VRAM 58. The GPU 50 and the GPU 52 respectively access the first VRAM 56 and the second VRAM 58 to obtain data necessary for executing the graphics command (image data: character data, texture data, etc.). It should be noted that the CPU core 42 reads image data necessary for rendering from the RAM 48, and writes it to the first VRAM 56 and the second VRAM 58 via the GPU 50 and the GPU 52. The GPU 50 accesses the VRAM 56 to generate game image data for display, and stores it in a rendering buffer in the VRAM 56. The GPU 52 accesses the VRAM 58 to create game image data for rendering, and stores the image data in a rendering buffer of the VRAM 58. A flame buffer or a line buffer may be employed as a rendering buffer.

The VRAM 56 and the VRAM 58 are connected to the LCD controller 60. The LCD controller 60 includes a register 62, and the register 62 consists of one bit, for example, and stores a value of "0" or "1" (data value) according to an instruction of the CPU core 42. The LCD controller 60 outputs the game image data created by the GPU 50 to the LCD 12, and outputs the game image data created by the GPU 52 to the LCD 14 in a case that the data value of the register 62 is "0". On the other hand, the LCD controller 60 outputs the game image data created by the GPU 50 to the LCD 14, and outputs the game image data created by the GPU 52 to the LCD 12 in a case that the data value of the register 62 is "1".

It should be noted that the LCD controller 60 can directly read the game image data from the VRAM 56 and the VRAM 58, or read the game image data from the VRAM 56 and the VRAM 58 via the GPU 50 and the GPU 52.

Also, the VRAM 56 and the VRAM 58 may be provided in the RAM 48, or the rendering buffer and a Z buffer may be provided in the RAM 48.

The I/F circuit 54 is connected with the operating switch 20, the touch panel 22 and the speaker 32. Here, the operating switch 20 is the above-described switches 20*a*, 20*b*, 20*c*, 20*d*, 20*e*, 20L and 20R, and in response to an operation of the operating switch 20, a corresponding operation signal (operation data) is input to the CPU core 42 via the I/F circuit 54. Furthermore, operation data output from the touch panel 22 (coordinates data) is input to the CPU core 42 via the I/F circuit 54. In addition, the CPU core 42 reads from the RAM 48 the sound data necessary for the game such as a game music (BGM), a sound effect or voices of a game character (onomatopoeic sound), etc., and outputs it from the speaker 32 via the I/F circuit 54.

The wireless communication portion 64 is a communication means for wirelessly sending and receiving data with other game apparatuses 10 or communications equipment. The wireless communication portion 64 modulates communication data to be transmitted to the opponent into a radio signal to send it from an antenna, and receives a radio signal from the opponent by the same antenna to demodulate it to communication data. Via the wireless communication portion 64, the game apparatus 10 sends and receives data with other game apparatuses 10 to execute a communication game. The wireless communication portion 64 is compatible with IEEE 802.11 (Wi-Fi), for example, and can send and receive data with other game apparatuses 10 and communications equipment by a wireless LAN. The game apparatus 10 may execute a communication game with another nearby game apparatus 10, for example, by the wireless LAN. Also, the game apparatus 10 can send and receive data with other computer (server and game apparatus 10, etc.) over the Internet by utilizing the TCP/IP Protocol. Accordingly, the game apparatus 10 can access an Internet service provider (ISP) through a wireless LAN access point, such as a household LAN, a public wireless LAN, or the like so as to be connected to a network such as, the Internet or the WAN (Wide Area Network) via the ISP. This allows a game apparatus 10 to play a communication game with another game apparatus 10 which is connected to the Internet away from the game apparatus 10.

It should be noted that the wireless communication portion 64 may work according to other wireless communication standards such as Bluetooth, for example, in place of the wireless LAN standard.

Also, the wireless communication portion 64 can execute a wireless communication on the basis of a time division multiple access system, for example. The communication game with another nearby game apparatus 10 may be executed by the wireless communication system. For example, each game apparatus 10 is assigned a time slot during one communication cycle, and by the assigned slot, its own data is transmitted. It should be noted that for more information, a technique of such a wireless communication is described in detail in Japanese Patent Publication No. 2004-135778 and 2004-136009 by the present applicant.

Figure 3:
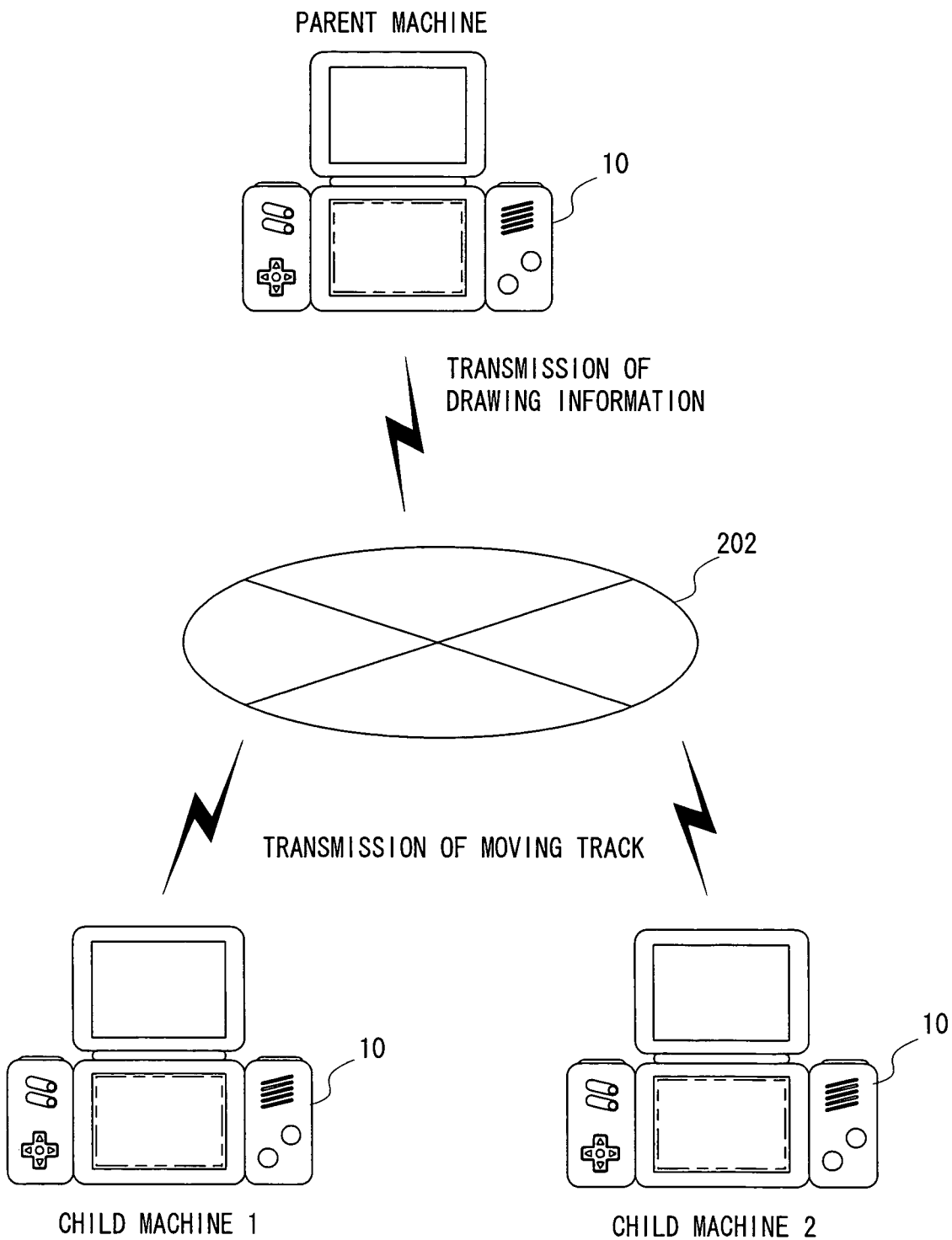
FIG. 3 is an illustrative view showing one example of a communication game system of one exemplary embodiment.

With the use of a plurality of game apparatuses 10 as described above, a communication game system 200 of this exemplary embodiment is constructed. That is, as shown in FIG. 3, in the communication game system 200, a plurality of game apparatuses 10 are connected so as to be communicated with each other via a network 202 such as the Internet. It should be noted that each game apparatus 10 is wirelessly connected to the network 202 through an access point not shown.

A communication game in which a plurality of objects appear in the virtual game space is executed among the plurality of game apparatuses 10. One or more objects out of the plurality of objects is assigned to each game apparatus 10 as an object to be operated. That is, a player of each game apparatus 10 operates one or more objects as a player object of his own.

Also, in this exemplary embodiment, one of the plurality of game apparatuses 10 becomes a parent machine, and the others are child machines. This enables data to be transmitted and received between the parent machine and the child machines. It should be noted that whether or not user's own apparatus is a parent machine or a child machine is selected by each player on a selection screen, for example.

Management of the game space is performed in the parent machine so as to provide continuity among the plurality of game apparatuses 10 without discrepancy. More specifically, the parent machine manages an action, such as movements of the plurality of objects within the game space. Each child machine transmits to the parent machine operation information as to the object input by the player in the child machine. The parent machine receives the operation information from each of the child machines, and moves the object corresponding to the child machine on the basis of the received operation information. In addition, the parent machine updates a state of the game space in which each object is moved, and generates drawing information to draw a game space including the moved object to transmit the drawing information to each of child machines. Each child machine receives the drawing information to generate and display a game screen by the drawing information. Thus, in each of the game apparatuses 10, a consistent game screen in synchronization with the parent game machine is displayed.

However, in the communication game system 200, a communication delay occurs due to passing through a relay instrument on the network 202, a communication distance, etc. For example, in such a method in which every time that an operation of the direction instructing switch 20*a* is present in the child machine, or in a case that successive operations are performed, the child machine transmits to the parent machine operation information one by one, delay of reception of the operation information may occur in the parent machine due to a communication delay. Due to the delay of reception, in the parent machine, the movement of the object may stop on the way. If the movement is stopped on the way, drawing information different from the operation input actually input in the child machine may be transmitted to each of the child machines.

Therefore, in this exemplary embodiment, in the child machine, a moving track of the object is obtained on the basis of the player's input. More specifically, in the child machine, a moving track indicating a route through which the object will move is obtained from the input information, and the moving track is transmitted to the parent machine. In the parent machine, the object corresponding to the child machine is moved along the moving track within the virtual game space, and drawing information to draw the virtual game space including the moved object is transmitted to each of the child machines. Thus, if the moving track of the object corresponding to each child machine is transmitted to the parent machine, information equivalent to a plurality of pieces of operation information can be transmitted with one input in comparison with a conventional case that operation information of each of the direction instructing switches is transmitted to the parent machine one by one. Thus, in the parent machine, even if a communication delay occurs after reception of the moving track, the route through which the object will move has already been obtained as a moving track, and therefore, it is possible to prevent the movement of the object being stopped halfway.

Figure 4:
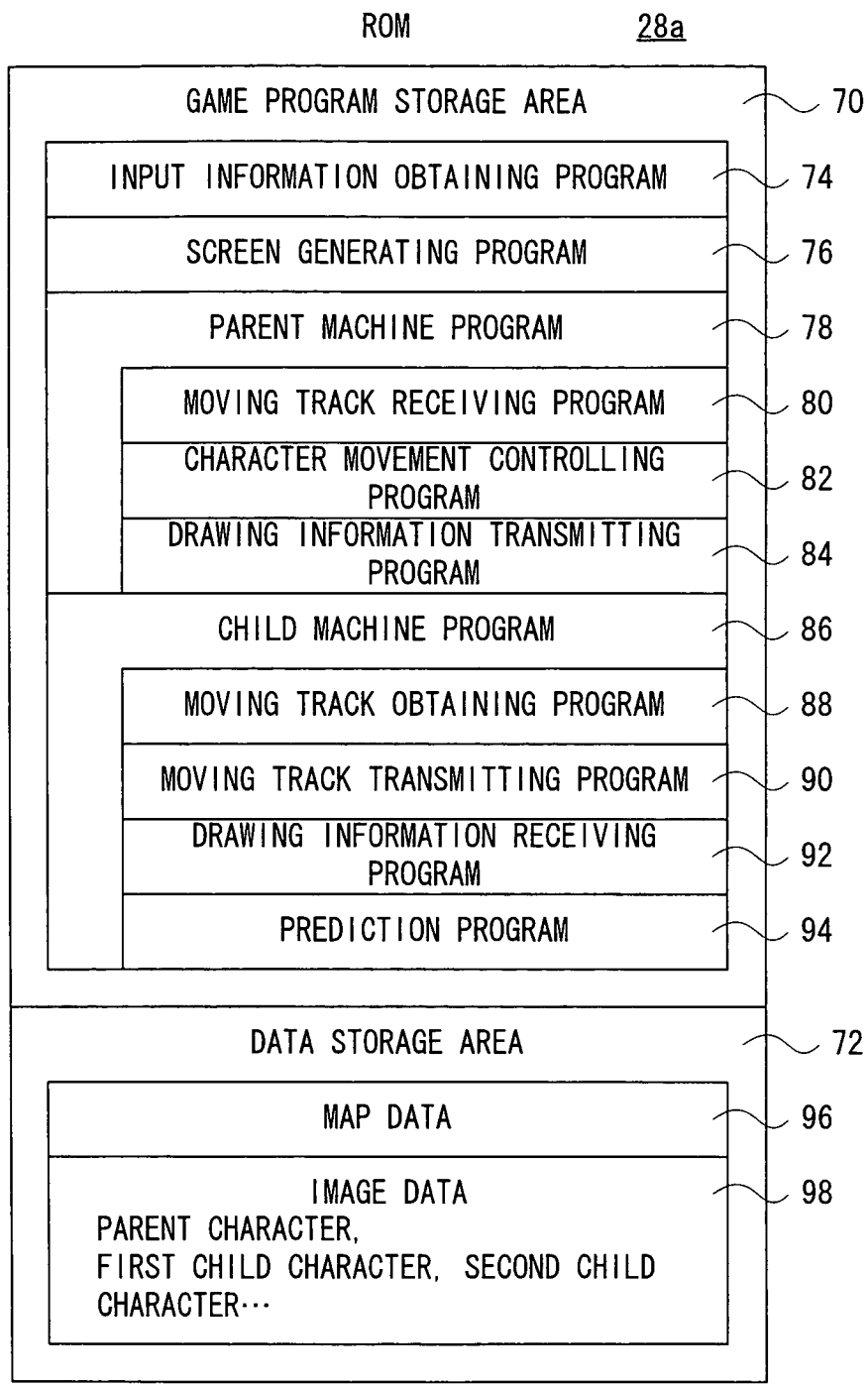
FIG. 4 is an illustrative view showing one example of a memory map of a ROM of a memory card.
Figure 5:
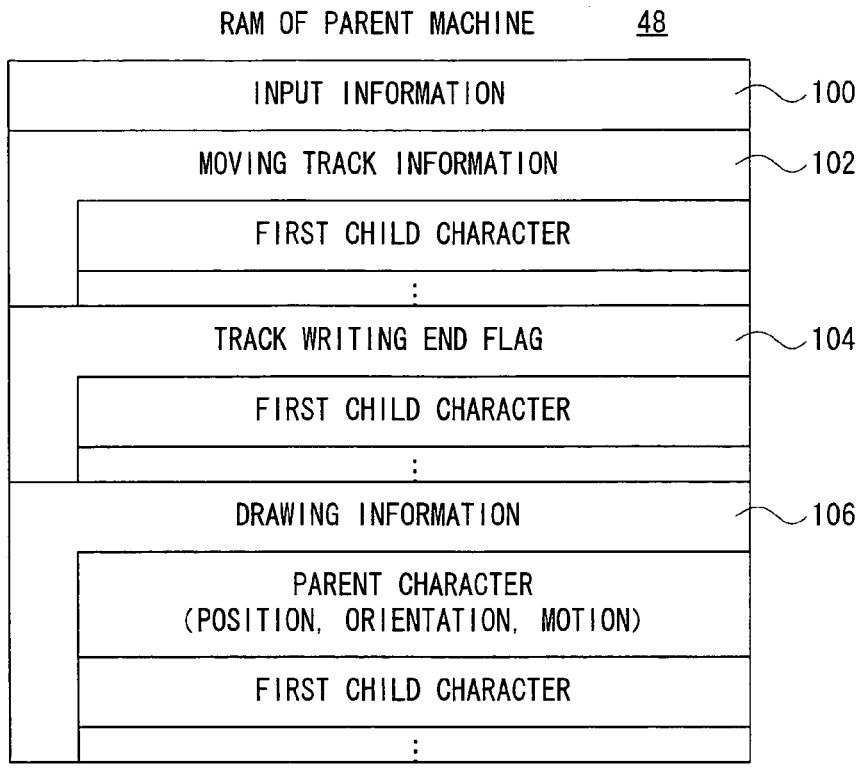
FIG. 5 is an illustrative view showing one example of a memory map of a RAM of a parent machine.
Figure 6:
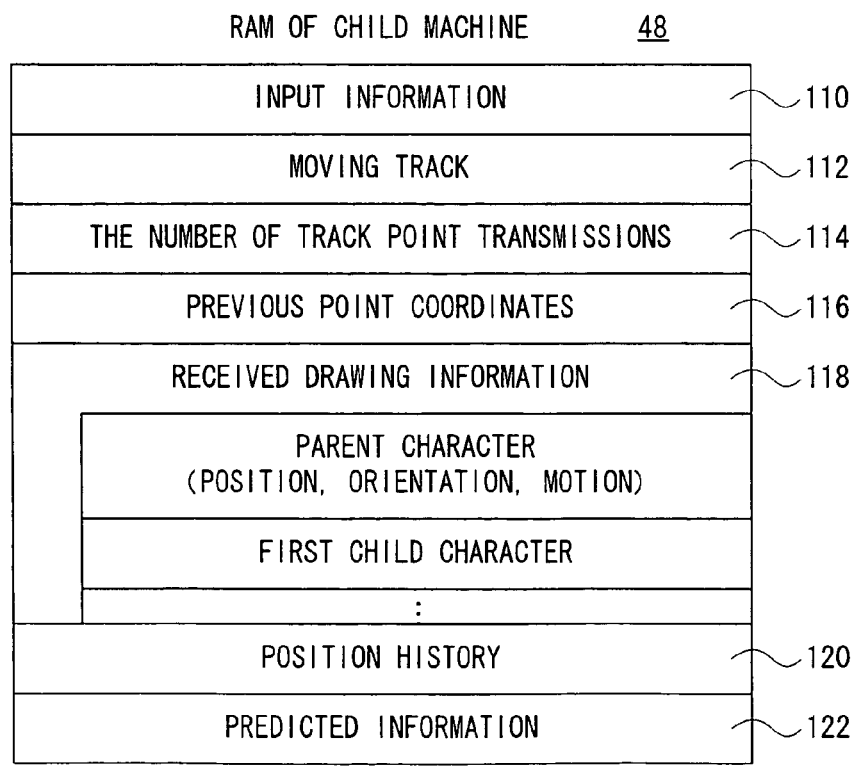
FIG. 6 is an illustrative view showing one example of a memory map of a RAM of a child machine.

FIG. 4 to FIG. 6 show one example of a memory map. FIG. 4 shows one example of a memory map of the ROM 28a of the memory card 28. The ROM 28a includes a game program storage area 70 and a data storage area 72. It should be noted that only a part of the memory map is shown in FIG. 4, and the game program storage area 70 and the data storage area 72 store in advance necessary various programs and data except for the illustrated ones.

In a storage area 74 of the game program storage area 70, an input information obtaining program is stored. By the program, operation information from the operating switch 20 and operation information (including detected coordinates) detected by the touch panel 22 are obtained as input information at regular time intervals (one frame, etc.). In the absence of an input by the player, information indicative of a no-input is obtained.

In a storage area 76, a screen generating program is stored. By the program, a game screen is generated on the basis of the drawing information so as to be displayed on the LCD 12 or 14.

In a storage area 78, a program (parent machine program) to be executed when the game apparatus 10 functions as a parent machine is stored. In a storage area 80 of the parent machine program storing area 78, a moving track receiving program is stored. By the program, moving track information of each object to be transmitted from each child machine is received.

In a storage area 82 of the parent machine program storing area 78, a character movement controlling program is stored. By the program, the movements of the plurality of characters (objects) existing in the game space are controlled. The movement of the object corresponding to the child machine among the plurality of objects is controlled on the basis of the moving track received from the child machine. That is, the object to be operated by a child machine (child object or child character) moves along the moving track in the virtual game space. The moving track is a route through which the object will move as described above, and in this exemplary embodiment, coordinates of each points on the moving track is two-dimensional coordinates (x, y) obtained by a player's input to a two-dimensional map displayed on the LCD 14. The virtual game space is represented by a three-dimensional manner, and therefore, the character movement controlling program transforms each point of the obtained moving track into three-dimensional coordinates (x, y, z) of the coordinates system in a virtual three-dimensional game space, and moves the child object along the transformed moving track in the three-dimensional coordinates.

Also, the movement of the object corresponding to the parent machine among the plurality of objects in the game space is controlled on the basis of the operation information of the direction instructing switch 20a among the operating switches 20 in this exemplary embodiment. That is, the object to be operated by the parent machine (parent object or parent character) is moved in a direction instructed by the operating switch 20a.

It should be noted that as described later, in transmitting the moving track of the child object, information on individual points is not sequentially transmitted, but information on a plurality of points are collectively transmitted, and therefore, the movement of the child object is not performed in real time. On the other hand, in this exemplary embodiment, the movement control of the parent object is directly executed in response to the operation information of the operating switch 20a, that is, the player of the parent machine can operate the action including the movement of the parent object in real time.

Thus, in this exemplary embodiment, the child character to be operated by the child machine is moved on the route by the input of the moving track while the parent character to be operated by the parent machine is moved in real time in response to an action instruction.

Accordingly, it is possible to realize a communication game capable of avoiding an adversely effect of a communication delay, and being high in interest and strategy. For example, the child character moves along the input moving track to thereby follow the parent character, and the parent character attains a predetermined objective while avoiding contacting with the child character.

It should be noted that in another exemplary embodiment, the movement of the parent object may be controlled on the basis of the moving track obtained by the parent machine similarly to the child object. That is, the parent object is also not moved in real time.

In a storage area 84 of the parent machine program storing area 78, a drawing information transmitting program is stored. By the program, drawing information to draw a virtual game space is transmitted to each child machine. The drawing information is generated in the parent machine after the movements of the plurality of objects are controlled by the character movement controlling program, and the state in the virtual game space is updated. That is, the drawing information is information to draw the virtual game space after the object corresponding to the child machine is moved based on the moving track received by the child machine. The drawing information includes an object position in the virtual game space as a representative example. Also, information indicating a direction of an object and a motion to cause an object to perform a specific action may be included as another example.

In a storage area 86, a program (child machine program) to be executed when the game apparatus 10 functions as a child machine is stored. In a storage area 88 of the child machine program storing area 86, a moving track obtaining program is stored. By the program, a moving track for moving the child object is obtained. More specifically, the moving track is obtained in response to a trace input on the touch panel 22 of the LCD 14 on which a two-dimensional map of the game space is displayed. That is, the moving track is obtained on the basis of a plurality of coordinates successively detected by sliding the stick 24, etc. on the touch panel 22 by the player. It should be noted that in this exemplary embodiment, when inputting a moving track, the player first touches an icon image of the child object in advance to thereby select a child object which he wants to operate. Then, the player moves the stick 24, etc. to a desired position by a desired route with the stick 24, etc. touched, and finally releases the stick 24, etc. from the touch panel 22 to thereby end the trace input to the child object. Thus, in this exemplary embodiment, a moving track is obtained from the plurality of coordinates continuously detected from the start of touching the child object to the end of touching it. It should be noted that coordinates of each point detected on the touch panel 22 is a two-dimensional coordinates (X, Y) in the coordinates system on the touch panel 22. Accordingly, by checking the detected coordinates against the information of the two-dimensional map displayed on the LCD 14 when inputting, the detected coordinates (X, Y) is transformed into the coordinates (x, y) on a horizontal plane in the coordinates system of the virtual three-dimensional game space, and the moving track represented by the transformed coordinates (x, y) is obtained.

Furthermore, in this exemplary embodiment, the moving track to be obtained has a maximum length. That is, if it is determined that a condition that the length of the moving track exceeds a predetermined threshold value is satisfied, even when an input is detected from the touch panel 22, the input is not accepted as a moving track, and is not stored in the moving track information. The condition that the acceptance of the moving track is stopped is that the number of points obtained as a moving track exceeds a predetermined threshold value in this exemplary embodiment.

In a storage area 90 of the child machine program storing area 86, a moving track transmitting program is stored. By the program, a moving track is transmitted to the parent machine. Also, in this exemplary embodiment, every time that obtained moving track exceeds a predetermined length, the moving track information is sequentially transmitted to the parent machine. Thus, it is possible to reduce amount of data to be transmitted at once.

In a storage area 92 of the child machine program storing area 86, a drawing information receiving program is stored. By the program, drawing information transmitted from the parent machine is received. In the child machine, a game screen showing a game space including the child object corresponding to the child machine is generated on the basis of the drawing information, and the game screen is displayed on the LCDs 12 and 14.

In a storage area 94 of the child machine program storing area 86, a prediction program is stored. In the child machine, when the drawing information from the parent machine cannot be received more than a definite period of time due to a communication delay, at least a position of each object is predicted by the program. Then, according to the predicted result, a game screen is to be generated. More specifically, the child machine stores the moving track information of the child obj ect of his own, and thus the position of the child object is predicted by utilizing the moving track information. Originally, the movement of the child object is controlled in the parent machine on the basis of the moving track information, and therefore, the prediction on the basis of the moving track information is hardly missed, and a precise prediction is possible. Also, predictions of other objects are performed on the basis of histories of positions of the respective objects. In addition, when the drawing information from the parent machine is received after prediction, a next position is calculated by interpolation between the predicted position and the position included in the received drawing information. It should be noted that an orientation, etc. which the object faces except for the position may be predicted on the basis of the history.

In a storage area 96 of the data storage area 72, map data is stored. The map data is map data of the virtual game space, and includes information indicating a state of geographic features, and a state (position, orientation, and so on) of a structure, etc. in the game space. In a storage area 98, image data is stored. Image data, such as the parent character corresponding to the parent machine, a first child character, a second child character, . . . etc. corresponding to the child machine also are included.

FIG. 5 shows one example of a memory map of the RAM 48 in a case that the game apparatus 10 functions as a parent machine. It should be noted that in FIG. 5 also, only a part of the memory map is shown, and data necessary for the game processing is stored except for the illustrated ones.

In a storage area 100, input information is stored. The input information includes the operation information of the operating switch 20 and the detected information from the touch panel 22 obtained by the input information obtaining program.

In a storage area 102, moving track information obtained by the moving track receiving program is stored. The moving track information is a moving track of each child character received from each child machine, and is stored in correspondence with each character (first child character, . . . ) of each child machine.

In a storage area 104, a track writing end flag is stored. The track writing end flag indicates an end of the input of the moving track to the child character of the child machine, and is stored in correspondence with each child character (first child character, . . . ) of each child machine. The turning-on of the track writing end flag means that the input of the moving track is settled. On the other hand, the turning-off of the flag means that the input of the moving track is not settled. In the parent machine, if the track writing end flag is turned on, a movement control of the child character corresponding to the flag is executed. More specifically, when the input of the moving track is ended in the child machine, a track writing end command is transmitted to the parent machine. When the track writing end command corresponding to the child character is received from child machine in the parent machine, a track writing end flag corresponding to the child character of the child machine is turned on. The turning-on of the track writing end flag acts as a trigger to start movement of the child character corresponding to the flag. On the other hand, when the input of the moving track is started in the child machine, a line clear command is transmitted to the parent machine. When the line clear command corresponding to the child character is received from the child machine in the parent machine, the track writing end flag with respect to the child character of the child machine is turned off.

In a storage area 106, generated drawing information is stored. The drawing information is information to draw a virtual game space, and includes information to draw each object (parent character, first child character, etc.) appearing in the virtual game space. More specifically, with respect to each player character (player object) to be operated by a player of each game apparatus 10, the drawing information includes information such as a position (coordinates), an orientation, a motion, etc. Here, the motion means the kind of a physical movement to be performed by a character. For example, for movement, the motion is information to designate motion data for causing a character to swing its hands and move its legs.

FIG. 6 shows one example of a memory map of the RAM 48 in a case that the game apparatus 10 functions as a child machine. It should be noted that in FIG. 6 also, a part of the memory map is displayed, and other necessary data is stored.

In a storage area 110, input information obtained by the input information obtaining program is stored. The input information includes the operation information of the operating switch 20 and the detected information from the touch panel 22.

In a storage area 112, a moving track obtained on the basis of the input information by the moving track obtaining program is stored. The moving track information is stored in correspondence with a child character to be operated now. As described above, in this exemplary embodiment, every time that the length of the obtained moving track is above a constant, the moving track information which has already been stored is sequentially transmitted to the parent machine. Also, the number of the points transmitted to the parent machine as a moving track is equal to or more than a constant value, the input of the moving track is not accepted, and the moving track is not stored in the storage area 112 even if the player continues to input.

In a storage area 114, the number of track point transmissions is stored. The number of track point transmissions means the number of coordinates points transmitted as a moving track. Every time that the length of the moving track is above a certain distance, and the moving track is transmitted to the parent machine, the number of points included in the moving track is counted, and a cumulative total of the number of points which has been transmitted by now is stored as the number of track point transmissions.

In a storage area 116, previous point coordinates are stored. In this exemplary embodiment, every time that the length of the obtained moving track is equal to or more than the constant value, a transmission is executed, and therefore, in order to be referred to a next calculation of the distance of the moving track, the current detected coordinates are stored as previous point coordinates.

In a storage area 118, received drawing information is stored. The received drawing information is drawing information received from the parent machine according to the drawing information receiving program. The drawing information (position, orientation, motion, etc.) for each character (parent character, first character, . . . ) appearing in the game space is stored. In the child machine, a game screen showing a game space including the child character to be operated by the child machine is generated on the basis of the received drawing information and displayed on the LCDs 12 and 14.

In a storage area 120, position history information is stored. More specifically, a history of position information is stored for each character. The history of each character includes coordinates of at least past two times (two frames immediately before, for example), that is, previous and current coordinates. Also, in the storage area 120, a history of the orientation information of each character is also stored. In a prediction according to a prediction program, the history is referred.

In a storage area 122, predicted information is stored. More specifically, information indicating at least a position of each character predicted according to the prediction program is stored.

In the communication game system 200, when moving a child character in the child machine, the player operates the operating switch 20L, for example. Thus, as shown in FIG. 7, a two-dimensional game screen showing a two-dimensional map of the game space is displayed on the LCD 14 on which the touch panel 22 is set, and a three-dimensional game screen showing the virtual three-dimensional game space is displayed on the other LCD 12. The player draws a track on the map screen of the LCD 14 to thereby input a moving track of the child character.

On the map screen, icons 130*a*, 130*b*, 130*c* indicating child characters which are operable by a child machine are displayed in positions corresponding to existing positions of the child character in the three-dimensional game space. In the child machine, a plurality of child character can be operated, and the icons 130*a*, 130*b*, 130*c* of the three child characters are displayed. On the other hand, on the LCD12, the three-dimensional game screen including a child character 132*a* corresponding to the icon 130*a* is displayed. It should be noted that the child character icons 130*a-c* may be collectively denoted by a reference numeral 130, and the child characters 132*a-c* corresponding to the respective icons 130*a-c* may be collectively denoted as a reference numeral 132.

When inputting a moving track of the child character 132, the player touches the icon 130 corresponding to the child character 132 which he or she wants to move with the stick 24, etc., and slides the stick 24, etc. through a desired route to a desired position with the stick 24, etc. touched on. In FIG. 7, an input is made on the icon 130*a* corresponding to the child character 132*a*. In response to the movement of the stick 24, etc., the coordinates of the touch positions are successively detected, and moving track information is obtained on the basis of the detected successive coordinates. Also, on the map screen, the dot corresponding to the touch position is changed to a predetermined color (white, etc.) differently from a ground color, and the input trace is drawn on the map screen as shown in the lower screen in FIG. 7. It should be noted that in FIG. 7, inputs of the moving track with respect to the child character 132 corresponding to other icons 130*b*, 130*c* have already been finished, and the color of the moving tracks of the icons 130*b*, 130*c* are changed to a predetermined color (black, etc.) different from that of the icon 130*a*. Furthermore, the respective icons 130*b*, 130*c* are moving along their moving tracks.

When the icon 130 is touched, the parent machine is informed that an input of the moving track to the child character 132 is started with respect to the corresponding child character 132 by a line clear command. Every time that the length of the obtained moving track is equal to or more than a certain value, the moving track information is sequentially transmitted to the parent machine. It should be noted that the transmission is performed by a point addition command.

Then, the player of the child machine can end the input of the moving track by releasing the stick 24, etc. from the touch panel 22. When the input of the moving track is ended, a writing end command is transmitted from the child machine to the parent machine to inform a settlement of the moving track input. In the parent machine, a movement control of the child character is started on the basis of the moving track. Then, drawing information to draw a game space including the child character moved along the moving track is generated, and transmitted to the respective child machines. Game screens are generated to update the displays on the LCDs 12 and 14 on the basis of the generated drawing information in the parent machine and on the basis of the received drawing information in the child machine.

Figure 8:
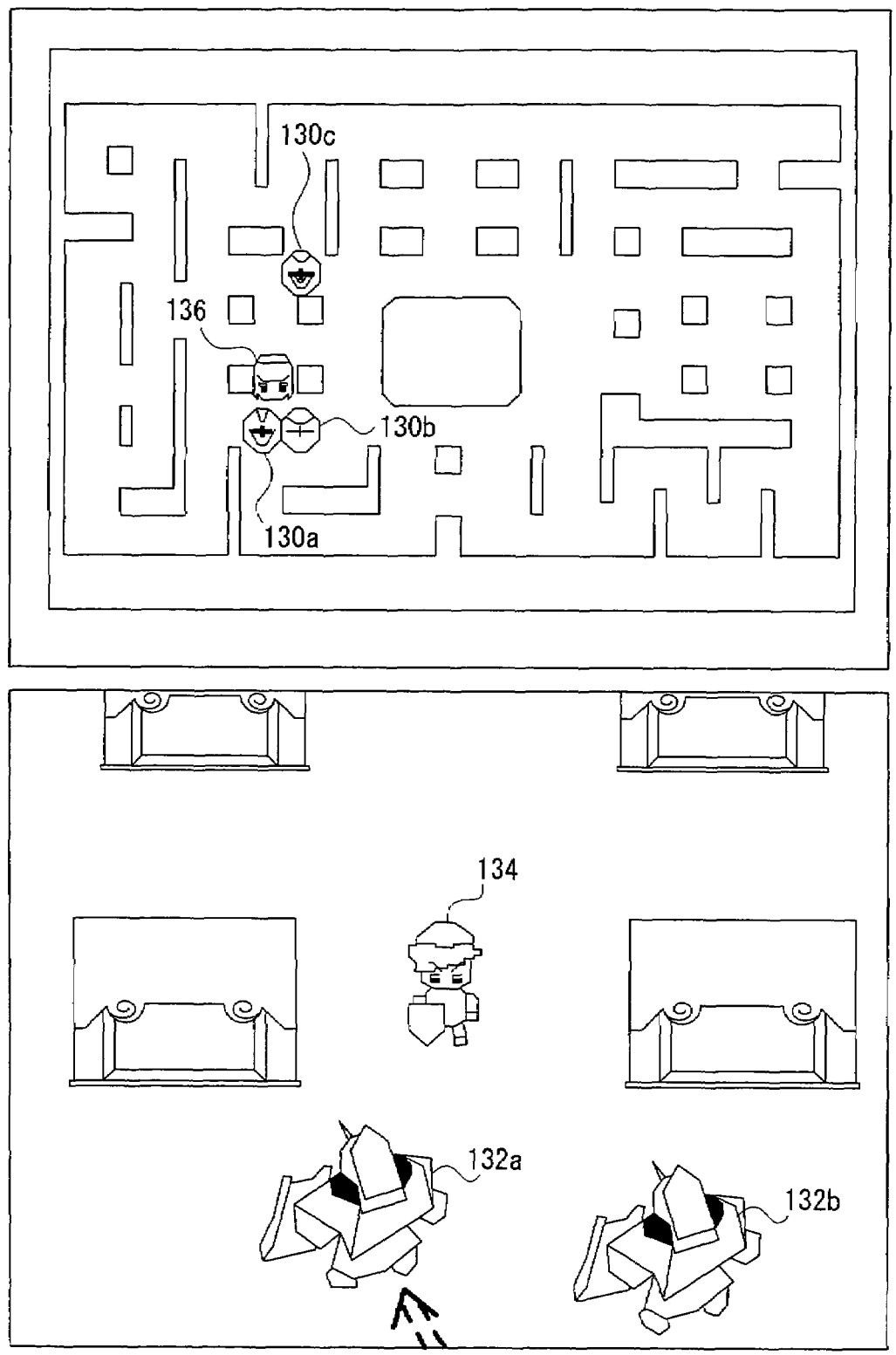
FIG. 8 is an illustrative view showing one example of a game screen generated by drawing information in the child machine.

As shown in FIG. 8, when a movement of the child character 132*a* is started in the child machine, the upper and lower screens are interchanged to display on the lower screen a scene in which the child character 132*a* moves along the moving track in the three-dimensional game space. It should be noted that FIG. 8 shows a scene in which the movement along the moving track has been completed. The child character 132*a* is a child character corresponding to the icon 130*a* on which an input of the moving track is performed in FIG. 7, and the child character 132*b* is a child character corresponding to the icon 130*b*. The child character 132*a* moves in front of the parent character 134 as a player character of the parent machine through the route shown by the dashed lines arrow (moving track) in the drawing. Furthermore, as shown in the upper screen in FIG. 8, each icon 130 moves along each moving track on the map screen, and reaches the surrounding of the icon 136 corresponding to the parent character 134.

It should be noted that in this exemplary embodiment, a game in which the parent character 134 is searched and followed by the child character 132 is performed, and therefore, the icon 136 of the parent character 134 in the map screen is displayed only when the parent character 134 exists within the display range of the child character 132*a* of the lower screen. Additionally, in FIG. 7 and FIG. 8, for simplicity shake, the display of the child characters and their icons corresponding to other child machines are omitted. Also, as shown in FIG. 8, in this exemplary embodiment, a parent character to be operated by a parent machine is only one, but a plurality of characters may be operated in the parent machine similarly to the child machine.

One example of game operations as to the parent machine and the child machine in the communication game system 200 is described with reference to flowcharts from FIG. 9 to FIG. 11, and FIG. 12 and FIG. 13.

Figure 9:
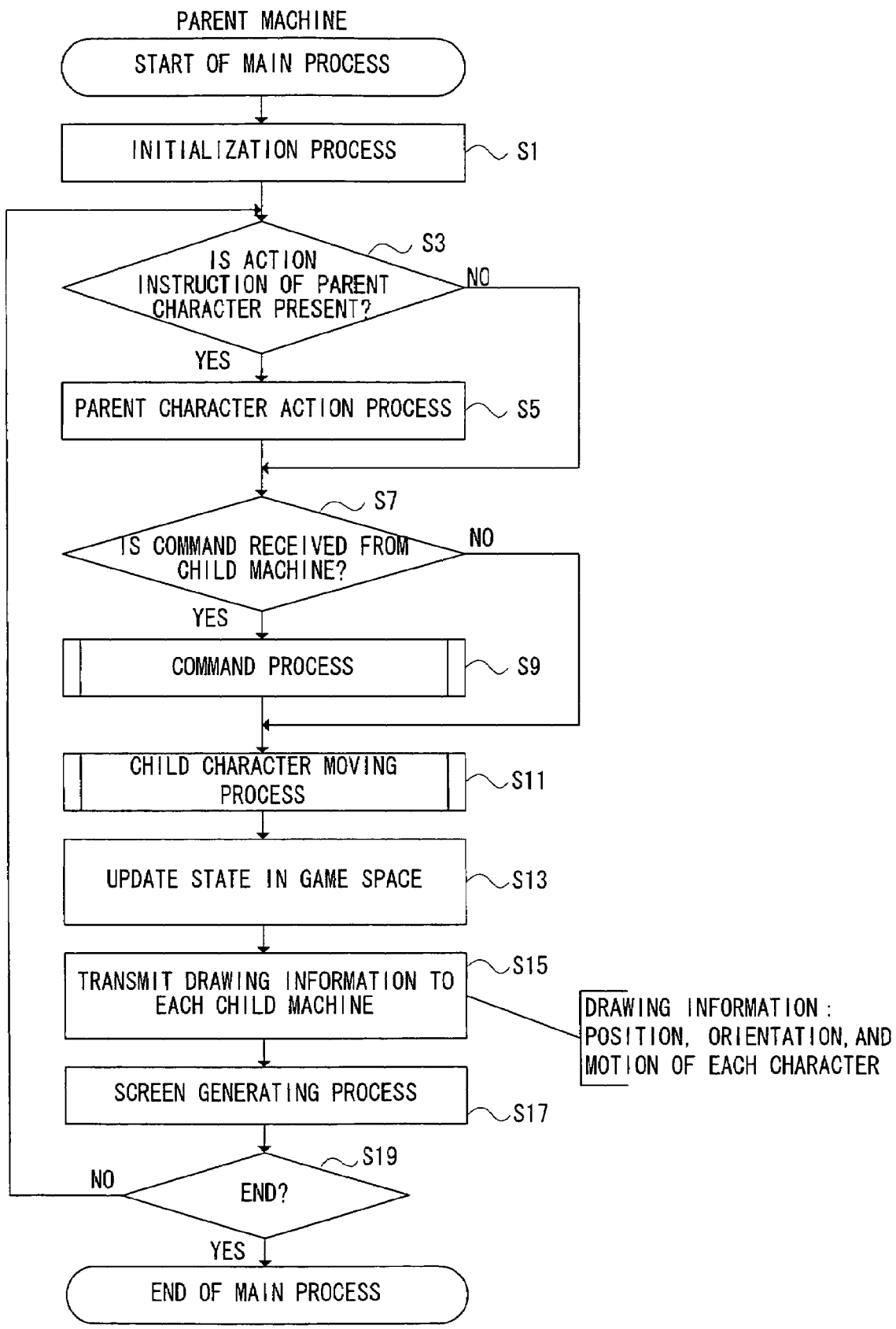
FIG. 9 is a flowchart showing one example of an operation of a main processing of the parent machine.

FIG. 9 shows an operation of a main processing of the parent machine. When starting the main processing, the CPU core 42 of the parent machine executes an initialization process in a step S1. Here, a communication connecting process is performed to enable a parent machine to connect for communication with each child machine via a network 202. Furthermore, initial values are set to the various variables.

The CPU core 42 executes processes from a following step S3 to a step S19 for every definite period of time (1 frame=1/60 second, for example). In the step S3, the CPU core 42 determines whether or not an action instruction of the parent character 134 is performed on the basis of the input information of the storage area 100. It should be noted that in the storage area 100, operation information from the operating switch 20 and operation information from the touch panel 22 are obtained at regular time intervals according to the input information obtaining program.

If "YES" is determined in the step S3, the CPU core 42 executes a parent character action process in the step S5. In this exemplary embodiment, an action such as moving the parent character 134 is controlled in response to an input of the operating switch 20. Accordingly, in a case of the operation information from the direction instructing switch 20a, for example, the parent character 134 is moved to an instructed direction. In a case of the operation information from the action switch 20d, the parent character 134 executes a predetermined movement. If "NO" is determined in the step S3, the process directly proceeds to the step S7.

In the step S7, the CPU core 42 determines whether or not a command is received from a child machine. If "YES" is determined, a command process is executed in the step S9 while if "NO" is determined, the process directly proceeds to the step S11. In the command process in the step S9, a process depending on the kind of the received command is performed. As described later, the child machine transmits to the parent machine three kinds of commands in correspondence to the levels of an input of the moving track to the child character 132. That is, when the input of the moving track to the icon 130 of the child character is started, a line clear command is transmitted (step S91 in FIG. 12). When the moving track input is continued, a point addition command is transmitted (step S103). When the moving track input is ended, a writing end command is transmitted (step S113 in FIG. 13).

Figure 10:
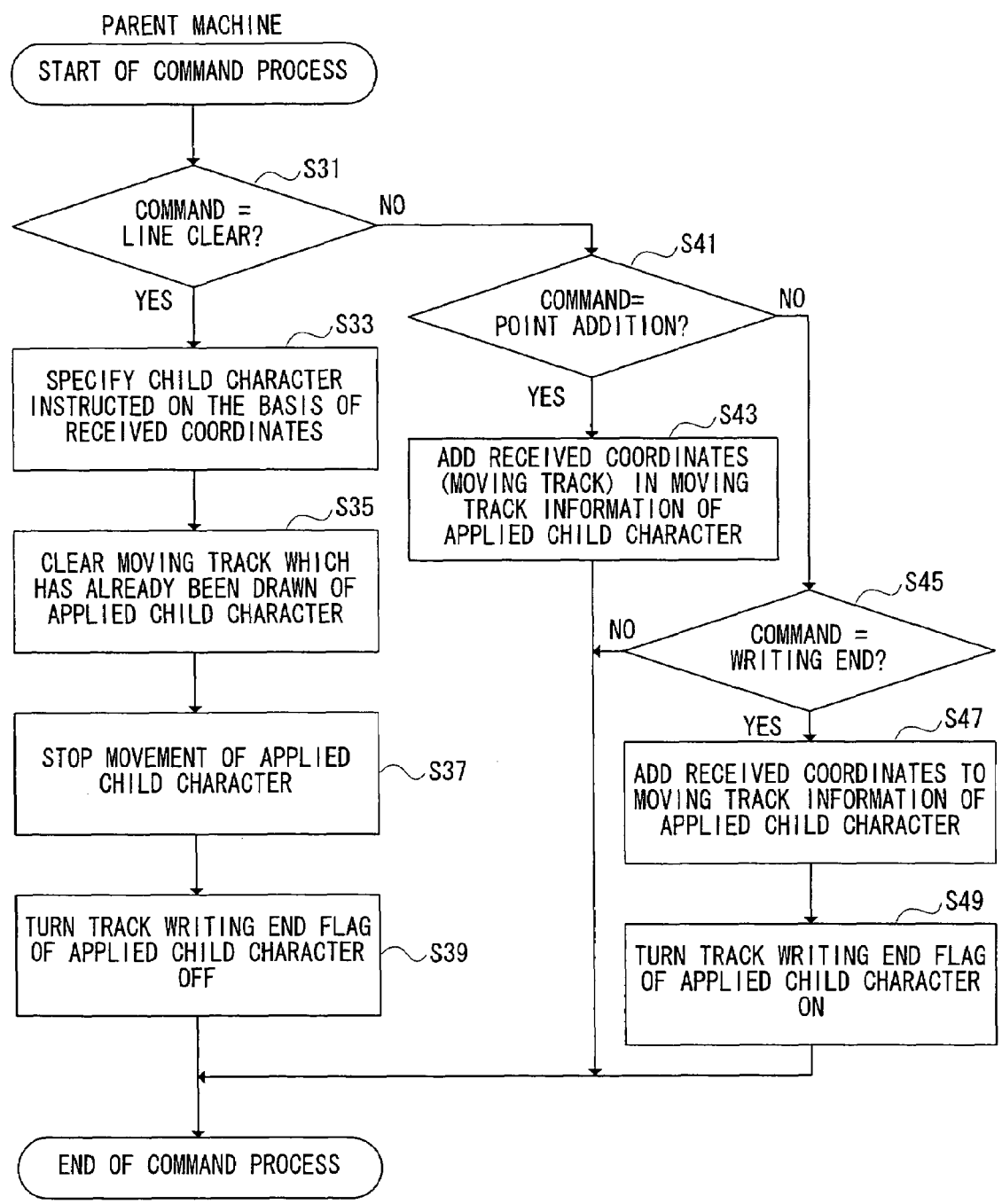
FIG. 10 is a flowchart showing one example of an operation of a command process in FIG. 9.

FIG. 10 shows one example of an operation of a command process. When starting the command process, the CPU core 42 first determines whether or not the received command is a line clear in a step S31. That is, it is determined whether or not a moving track input is started in the child machine from which the command is transmitted.

If "YES" is determined in the step S31, the CPU core 42 specifies the child character 132 instructed by the child machine out of the plurality of child characters 132 on the basis of the received coordinates in a step S33. More specifically, the icon 130 and the child character 132 to which the moving track is started to be input are specified on the basis of the instructed coordinates in the child machine included in the received command and the coordinates of the icons 130 of the plurality of the child characters corresponding to the child machines (stored in the RAM 48). It should be noted that the child machine may specify the instructed child character 132, and transmit a command including identification information of the instructed child character 132.

In a succeeding step S35, the CPU core 42 clears the moving track of the applied child character 132 which has already been drawn. More specifically, the moving track information corresponding to the applied child character 132 is erased from the storage area 102. The stored information is the moving track information which was input to the child character 132 in the past, and the child character 132 is moving or stopped moving on the basis of the moving track information.

Thus, in this exemplary embodiment, in response to a start of another moving track input to a certain child character in the child machine, the parent machine clears the obtained moving track information. Accordingly, even while a certain child character is moved along the moving track, when a new input of the moving track is started, the movement based on the old moving track can be stopped.

That is, in a step S37, the CPU core 42 stops the movement of the applied child character 132. In a succeeding step S39, the CPU core 42 turns the track writing end flag of the applied child character 132 off in the storage area 104. When the track writing end flag is turned on, a movement control of the applied child character 132 is performed. Thus, in the step S39, another input of the moving track is started by the player of the child machine, and therefore, by turning the track writing end flag off, the movement control of the applied child character 132 is not performed. After completion of the process in the step S39, the command process is ended, and the process returns to the step S11 in FIG. 9.

On the other hand, if "NO" in the step S31, the CPU core 42 determines whether or not the received command is a point addition in a step S41. That is, it is determined whether or not the information including the input moving track is received. If "YES" is determined in the step S41, the CPU core 42 adds the received coordinates, that is, the moving track to the moving track information of the applied child character 132 in the storage area 102 in a step S43. In this exemplary embodiment, a moving track is sequentially transmitted from the child machine every time the length of the moving track exceeds a predetermined length, and therefore, in the storage area 102, a plurality of coordinates which are successively obtained from the start of input to the child character 132, that is, a moving track are accumulated. The coordinates of each point showing the moving track are stored in association with an identification number (identification information of each point), for example. After completion of the step S43, the command process is ended, and the process returns to the step S11 in FIG. 9.

Also, if "NO" in the step S41, the CPU core 42 determines whether or not the received command is a writing end in a step S45. That is, it is determined whether or not the input of the moving track is ended in the child machine. If "YES" is determined in the step S45, in the presence of the coordinates in the received command, the CPU core 42 adds the received coordinates to the moving track information of the applied child character 132 in the storage area 102 in a step S47. Then, in a step S49, the CPU core 42 turns on the track writing end flag of the applied child character 132 in the storage area 104. In response to the change of the track writing end flag from a turning-on to a turning-off, the movement of the child character 132 is started in the parent machine. After completion of the step S49, or If "NO" is determined in the step S45, the command process is ended, and the process returns to the step S11 in FIG. 9.

In the step S11 in FIG. 9, the CPU core 42 executes a child character moving process, and controls a movement of the child character of each of the child machines.

Figure 11:
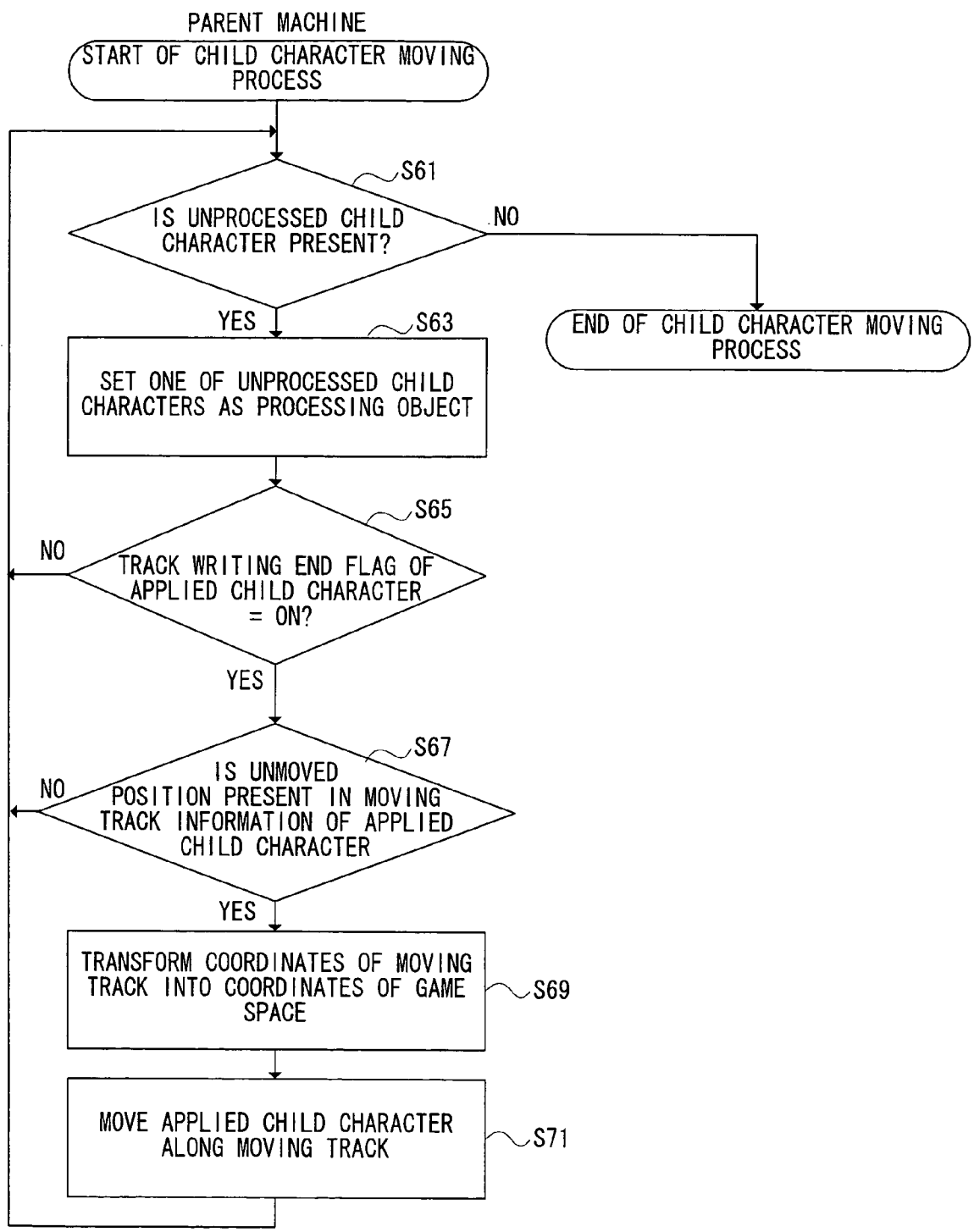
FIG. 11 is a flowchart showing one example of an operation of a child character moving process in FIG. 9.

FIG. 11 shows one example of an operation of the child character moving process. When starting the child character moving process, the CPU core 42 determines whether or not an unprocessed child character 132 exists in a step S61. That is, it is determined whether or not a child character 132 which has not yet been set as an object to be processed out of the plurality of child characters 132 remains. If "YES" is determined in the step S61, the CPU core 42 selects one of the unprocessed child characters 132 so as to set it as a processing object in a step S63.

In a succeeding step S65, the CPU core 42 determines whether or not the track writing end flag of the child character 132 as a processing object is turned on. In this exemplary embodiment, as described above, when an input of the moving track with respect to the child character 132 is ended, and the moving track is settled, the track writing end flag is turned on. Furthermore, when another moving track input is started with respect to the same child character 132, the moving track is not settled, the track writing end flag is turned off. That is, turning-on of the track writing end flag means a state in which the movement control of the child character 132 may be performed according to the input moving track. If "NO" in the step S65, that is, if the moving track is being input and is not settled, the process returns to the step S61.

On the other hand, if "YES" in the step S65, the movement of the child character is started. Thus, in this exemplary embodiment, in response to the end of the moving track input to the child machine, the movement of the child character is started. That is, after the entire input moving track (movement instructing information) is fetched, the movement of the child character is started, preventing the movement of the child character from being suspended by a communication delay.

It should be noted that when all the writing of the moving track is ended, the movement is started, but the movement starting condition may be changed as necessary. For example, in another exemplary embodiment, when it is determined that the moving track received by the parent machine is a predetermined length taking an affect of the communication delay into account, that is, is a moving track with enough time to prevent the movement from suspending even when a predetermined time delay occurs, the movement of the child character may be started before the entire moving track is obtained.

More specifically, in a step S67, the CPU core 42 determines whether or not an unmoved position exists in the moving track information of the child character 132 as an object to be processed. That is, it is determined whether or not a point which is not used for the movement control remains out of the respective points of the moving track stored in the storage area 102. For example, since each point of the moving track is stored in association with the identification number, by counting the number of points on which a movement process has been performed, or storing the identification number, it is possible to determine the presence or absence of the unprocessed point. If "NO" in the step S67, that is, if the movement of the child character 132 according to the input moving track has already been finished, the process returns to the step S61.

On the other hand, if "YES" in the step S67, that is, if the movement of the child character 132 according to the moving track is to be started or continued, the CPU core 42 transforms the coordinates of the moving track into the coordinates of the game space in a step S69. Each of the coordinates of the moving track input and obtained on the map screen is two-dimensional coordinates (x, y), and therefore, the point of the coordinates with the identification number to be processed now are transformed into the three-dimensional coordinates (x, y, z) in the game space. As described above, an identification number is corresponded to each point of the moving track, and thus, by counting the number of points which has already been processed or by storing the identification number, it is possible to specify the point to be currently processed now out of the moving track.

Then, in a step S71, the CPU core 42 moves the child character along the moving track. That is, the coordinates after movement are calculated on the basis of the current coordinates of the child character 132 and the transformed coordinates of the moving track. The orientation after movement of the child character 132 is calculated on the basis of the current coordinates, the transformed coordinates of the moving track, and the current orientation. After completion of the step S71, the process returns to the step S61. On the other hand, If "NO" is determined in the step S61, that is, if the process is performed on all the child characters 132 in the frame, the child character moving process is ended, and then, the process returns to the step S13 in FIG. 9.

Thus, in the parent machine, moving track information including a plurality of coordinates points is received in the command process in the step S9, and if the child character starts to move in the child character moving process in the step S11, the child character 132 is moved according to the moving track. Thus, problems of missing the reception of the movement instructing information of the child character 132 due to communication delay to thereby suspend the movement of the child character 132 do not occur.

In the step S13 in FIG. 9, the CPU core 42 updates a state in the game space. That is, information such as a position, an orientation, a motion of each character in the game space stored in the RAM 48 is updated on the basis of the results of the parent character action process in the step S5, the child character moving process in the step S11, and etc. More specifically, the position information is the coordinates of the object after movement in the virtual three-dimensional game space. It should be noted that out of the three-dimensional coordinates in the virtual game space, (x, y) correspond to the two-dimensional coordinates (x, y) on the map screen, and therefore, it is possible to also grasp the position of each character on the map screen according to the position information. The orientation information is a vector indicating the direction which the object faces, for example. The motion information is a physical movement to be executed according to an action of the object. For a moving object, for example, information for designating the motion data to display moving physical movement is stored as motion information.

In the succeeding step S15, the CPU core 42 generates drawing information to draw the updated game space to transmit the drawing information to each of the child machines. The drawing information is generated in the storage area 106, and includes information such as a position, an orientation, a motion, etc. of each character in the game space. For example, the drawing information relating to the entire game space is transmitted. Or, if the game space is larger than a display range of the screen, the drawing information relating to a part of the game space may be transmitted. As one example, only the drawing information relating an area (area slightly larger than the display area) away from the position of the child character 132 to be operated by the child machine by a predetermined distance or below may be transmitted to the child machine. In this case, only the information required for display of each child machine and a prediction process thereafter are transmitted, and therefore, it is possible to reduce amount of communication data.

In the step S17, the CPU core 42 executes a screen generating process. That is, on the basis of the drawing information, game screens including the parent character 134 (a three-dimensional game screen and a two-dimensional map screen in this exemplary embodiment) are generated and displayed on the LCD 12 and the LCD 14.

Then, in the step S19, the CPU core 42 determines whether or not the game is ended. For example, it is determined a game clear condition or a game over condition is satisfied. If "NO" in the step S19, the process returns to the step S3 in order to execute a game process of the next frame. On the other hand, if "YES" is determined in the step S19, the CPU core 42 executes a game end process not shown to end the main process.

Figure 12:
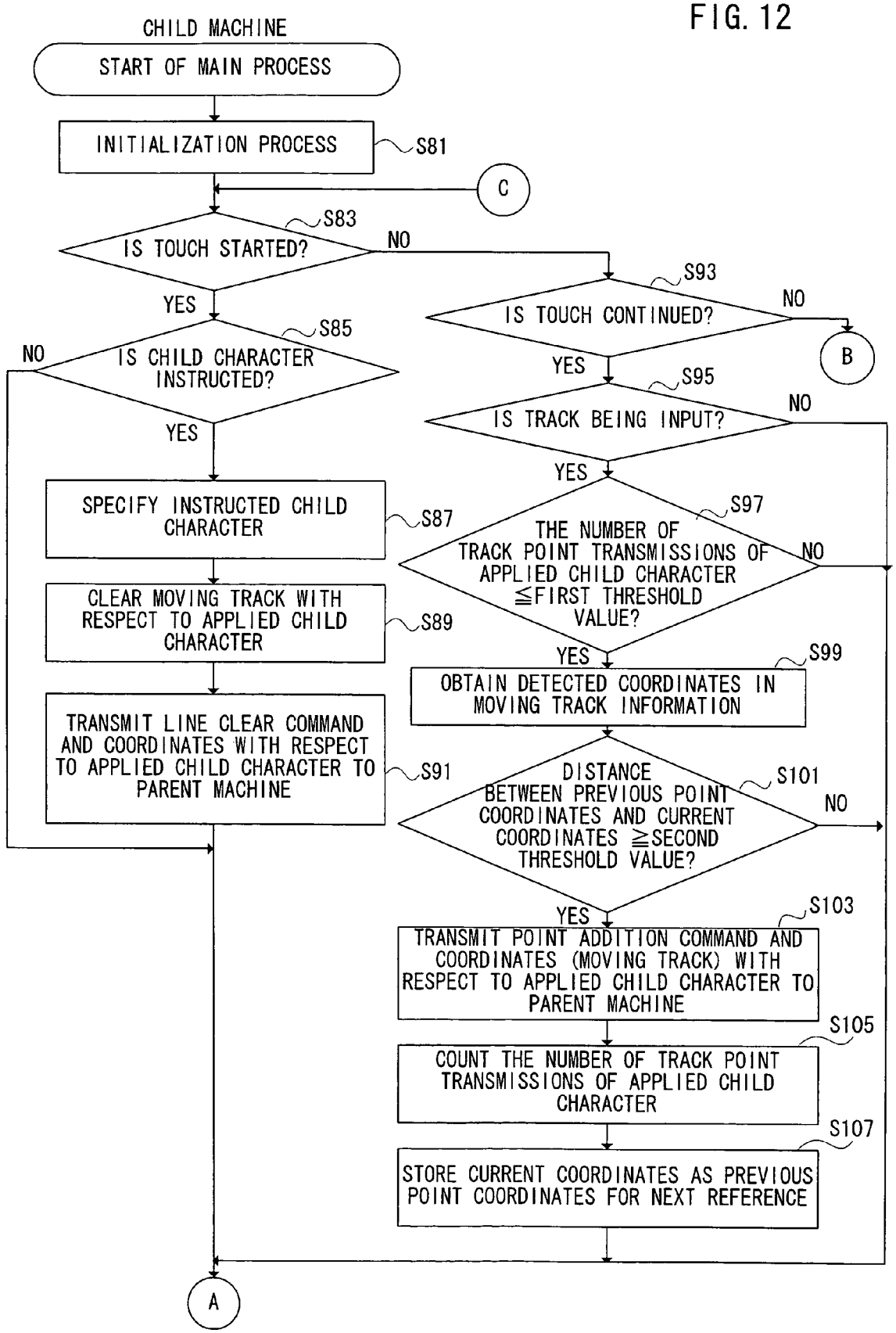
FIG. 12 is a flowchart showing one example of an operation of a main processing of the child machine.
Figure 13:
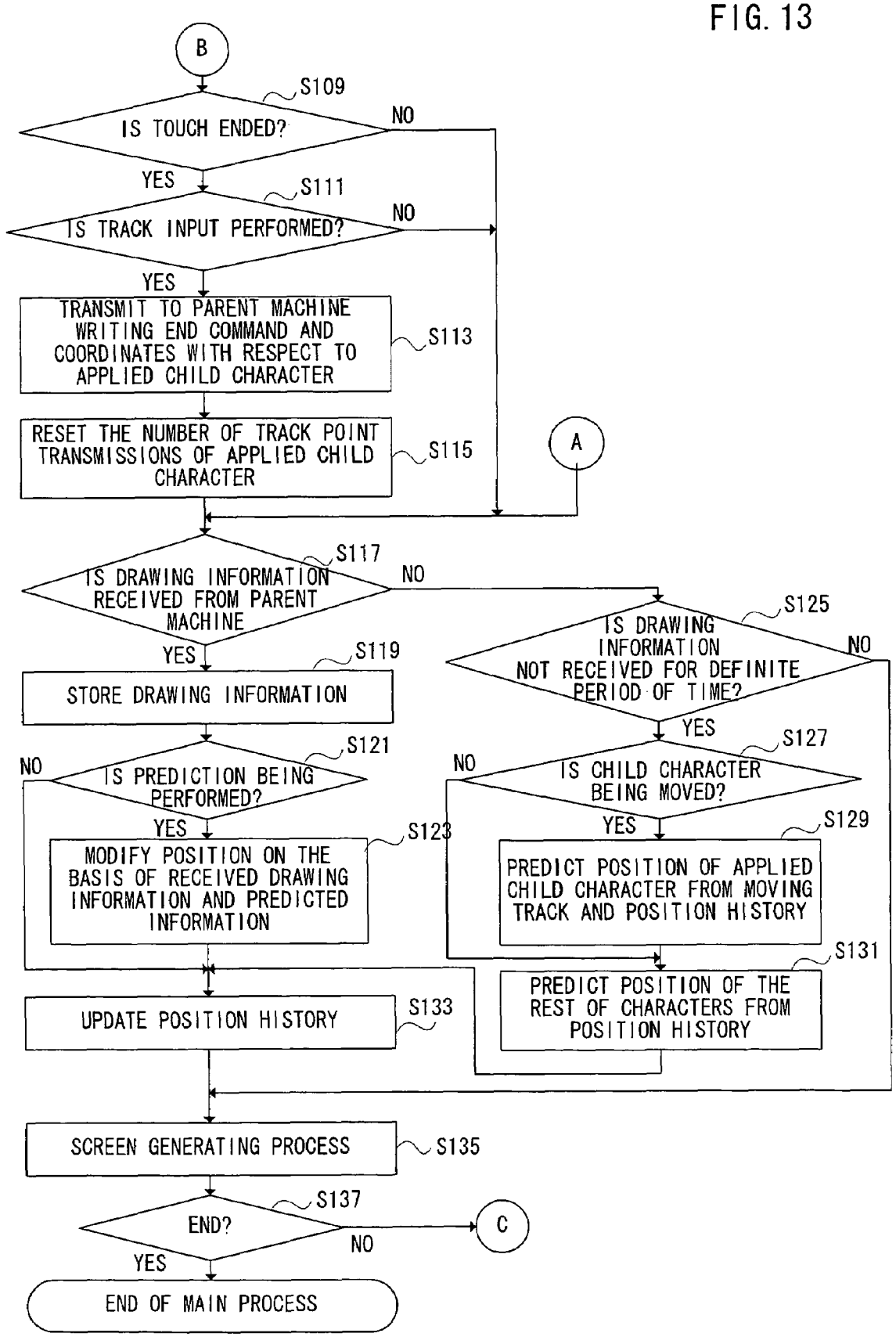
FIG. 13 is a flowchart continued from FIG. 12.

FIG. 12 and FIG. 13 show one example of an operation of a main process of the child machine. When starting the main process, the CPU core 42 of the child machine executes an initialization process in a step S81. More specifically, a communication connecting process is performed to cause the child machine to establish a communication connection with the parent machine via the network 202. Also, initial values are set to various variables.

The CPU core 42 executes processes from steps S83 to S137 at regular time intervals (one frame, for example). In the step S83, the CPU core 42 determines whether or not a touch input is started on the basis of the input information in the storage area 110. That is, it is determined whether or not a no-input state to the touch panel 22 is shifted to an input state thereto. It should be noted that the operation information from the operating switch 20 and the operation information from the touch panel 22 are obtained in the storage area 110 at regular time intervals according to the input information obtaining program.

If "YES" is determined in the step S83, the CPU core 42 determines whether or not the child character 132 is instructed in the step S85. That is, it is determined whether or not a position corresponding to the icon 130 on the two-dimensional map to be displayed on the LCD 14 is touched on the basis of the display position coordinates of the icon 130 stored in the RAM 48 and the detected coordinates (touch coordinates) stored in the input information storing area 110.

If "YES" is determined in the step S85, that is, if an input of the moving track to the child character 132 is started, the CPU core 42 specifies a instructed child character 132 out of the plurality of child characters 132 on the basis of the touch coordinates and a display position of each icon 130 in the step S87.

Thus, in this exemplary embodiment, when an input of the moving track is started, the selected child character is specified. Accordingly, in the child machine, a moving track for each child character can be obtained. That is, the player of the child machine performs a moving track input on an individual child character to operate each of the plurality of child characters.

In the succeeding step S89, the CPU core 42 clears the moving track information with respect to the applied child character 132 stored in the storage area 112. That is, the storage area for the applied child character 132 is cleared in order to store the coordinates of the respective points on the moving track to be input from this time. It should be noted that in order to subsequently determine whether or not a track input is being executed, an input flag to indicate that the input of the moving track is being executed may be turned on.

Thus, in this exemplary embodiment, in the child machine, the obtained moving track information can be stored until another input of the moving track is performed to a certain child character. Thus, it is possible to utilize the moving track information for a game processing as necessary. For example, as described later, when the drawing information is not received for a definite period of time, it is possible to predict the position of the child character by utilizing the moving track information.

Furthermore, in the step S91, the CPU core 42 transmits to the parent machine a line clear command and the detected coordinates with respect to the applied child character 132. By the transmission of the line clear command, it is possible to inform the parent machine of the start of the moving track input of the applied child character 132. After completion of the step S91, the process proceeds to the step S117 in FIG. 13. It should be noted that if "NO" in the step S85, that is, if the part except for the child character icon 130 on the map screen is touched, the process directly proceeds to the step S117.

On the other hand, if "NO" in the step S83, the CPU core 42 determines whether or not the touch state to the touch panel 22 is continued on the basis of the input information in the storage area 110 in the step S93. If "YES" is determined in the step S93, the CPU core 42 determines whether or not the track is being input in the step S95. For example, it is determined whether or not an input flag to indicate that a track input is being executed is turned on.

If "YES" is determined in the step S95, that is, if the input of the moving track is continued, the CPU core 42 determines whether or not the number of track point transmissions of the applied child character 132 is equal to or less than a predetermined first threshold value in the step S97. That is, it is determined that the number of the transmitted points out of the input moving track to the child character 132 does not exceed the predetermined limit value (first threshold value, 128 points, for example). Thus, in this exemplary embodiment, a movable distance by one track input is limited on the basis of the number of points comprising the moving track. That is, this puts restrictions on the length of the inputable moving track. Accordingly, the movable distance by one input can be restricted in an appropriate range. It should be noted that in another exemplary embodiment, no restriction may be imposed on the moving track.

If "YES" is determined in the step S97, the CPU core 42 obtains the detected coordinates in the moving track information of the storage area 112 in the step S99. The moving track information is stored for each child character 130. The coordinates of each of the points are transformed from the two-dimensional coordinates (X, Y) of the coordinates system of the touch panel 22 into the two-dimensional coordinates (x, y) of the coordinates system of the map screen, and the transformed coordinates are stored in correspondence with the identification number (serial number from the starting point) as identification information of each point in the storage area 112.

In a step S101, the CPU core 42 determines whether or not the distance between the previous point coordinates and the current coordinates is equal to or more than a predetermined second threshold value. The previous point coordinates means the coordinates of the last point out of the moving track which has been transmitted to the parent machine. It should be noted that if the moving track has not been transmitted, the coordinates at a start of the input are adopted. Thus, it is determined, here, whether or not a moving distance from the previous point coordinates to the current detected coordinates is equal to or more than the predetermined value (second threshold value). That is, it is determined whether or not the length of the moving track stored in the storage area 112 after the previous transmission or after the start of the touch input reaches the predetermined length to be transmitted to the parent machine. Thus, it is possible to sequentially transmit to the parent machine a moving track for each fixed length. That is, it is possible to reduce amount of data to be transmitted as a moving track at a time. It should be noted that in another exemplary embodiment, a moving track obtained every predetermined time period may be transmitted, or the moving track can be collectively transmitted after completion of all the input of the moving track.

If "YES" is determined in the step S101, the CPU core 42 transmits to the parent machine a point addition command and the detected coordinates (moving track) with respect to the applied child character 132 in the step S103. The moving track to be transmitted is a plurality of coordinates (strictly, coordinates transformed into the coordinates system of the map screen) which are continuously detected from the coordinates next to the previous point coordinates (or input starting point) to the current detected coordinates. Every time that the moving track with a fixed length is obtained, the moving track is sequentially transmitted to the parent machine by the point addition command.

In the step S105, the CPU core 42 counts the number of track point transmissions of the applied child character 132 on the basis of the transmitted moving track information. That is, the number of points on the moving track transmitted to the parent machine is summed up, and is stored in the storage area 114. The determination in the step S97 is performed on the basis of the number of track point transmissions.

In the step S107, the CPU core 42 stores the current detected coordinates in the storage area 116 as a previous point coordinates to be referred when a determination of the length of a next moving track (S101) is performed. After completion of the step S107, the process proceeds to the step S117 in FIG. 13.

It should be noted that if "NO" in the step S95, that is, if the input of the moving track is not performed, the process directly proceeds to the step S117 in FIG. 13. Also, if "NO" in the step S97, that is, if the number of coordinates which has already been transmitted to the parent machine as a moving track exceeds a limit, the acceptance of the moving track is stopped, and then, the process directly proceeds to the step S117. If "NO" in the step S101, that is, if the length of the moving track from the previous point coordinates (or input starting point) is smaller than the constant value, the process proceeds to the step S117 in FIG. 13 to pass on the transmission to the parent machine.

On the other hand, If "NO" is determined in the step S93, the CPU core 42 determines whether or not the touch is ended on the basis of the input information in the storage area 110 in the step S109 in FIG. 13. That is, it is determined whether or not an input state to the touch panel 22 is shifted to no-input-state thereto. If "YES" is determined in the step S109, the CPU core 42 determines whether or not the moving track input was performed in the step S111. For example, it is determined whether or not an input flag to indicate that the track input is being executed is turned on.

If "YES" is determined in the step S111, that is, if the input of the moving track is ended, the CPU core 42 transmits to the parent machine a writing end command and coordinates (moving track) with respect to the applied child character 132 in the step S113. The moving track transmitted along with the writing end command is a moving track which is determined to be short of the predetermined length in the step S101, or a moving track obtained in the storage area 112 from the time when the moving track is transmitted in the step S103 to the time when it is determined in the step S97 that the number of coordinates points transmitted exceeds the predetermined value.

Also, in the step S115, the CPU core 42 resets the number of track point transmissions of the applied child character 132 stored in the storage area 114 to zero. Also, since the input of the track is completed, an input flag to indicate that the track input is being executed is turned off.

It should be noted that if "NO" in the step S109, or if "NO" in the step S111, the process directly proceeds to the step S117.

In the step S117, the CPU core 42 determines whether or not the drawing information is received from the parent machine. If "YES" is determined in the step S117, the CPU core 42 stores the received drawing information in the storage area 118 in the step S119.

Succeedingly, in the step S121, the CPU core 42 determines whether or not a position prediction of the character is performed. As described later, the prediction is performed in a case that the drawing information has not been received for a definite period of time or above. For example, it is determined whether or not a prediction flag indicating that the prediction is being executed is turned on, or it is determined that whether or not the predicted information is stored in the storage area 122.

If "YES" is determined in the step S121, that is, if the drawing information is received when the prediction is performed, the CPU core 42 modifies the position of each character on the basis of the received drawing information and the predicted information in the step S123. More specifically, with respect to each of the characters, the coordinates included in the drawing information and the coordinates stored in the predicted information storage area 122 are interpolated with each other to calculate the corrected coordinates. As to the child character to be operated by the child machine of its own, slight error of the predicted position occurs, and therefore, it is possible to smoothly move the child character even after the position is modified in the step S123. Also, the predicted position is modified, and therefore, the above-described prediction flag is turned off. It should be noted that if "NO" in the step S121, that is, if the drawing information is received without any delay, the process directly proceeds to the step S133.

On the other hand, if "NO" is determined in the step S117, the CPU core 42 determines whether or not the drawing information has not been received for a definite period of time in the step S125. That is, it is determined whether or not the drawing information was not received from the parent machine after a lapse of definite period of time from the previous reception.

If "YES" is determined in the step S125, that is, if the reception of the drawing information is delayed by a communication delay, the CPU core 42 determines whether or not any one of the child characters corresponding to the child machine itself is being moved in the step S127. For example, it is determined whether or not an unmoved point out of the moving track stored in the storage area 112 remains. By the identification number of the position information of the child character from the received drawing information, it is grasped that the position corresponds to which point on the moving track, and therefore, it is possible to make the above-described determination.

If "YES" in the step S127, the CPU core 42 predicts the position of the applied child character 132 from the moving track information stored in the storage area 112 and the position history stored in the storage area 120 in the step S129. The position prediction of the child character 132 which is being moved is performed on the basis of the current coordinates and orientation, the previous coordinates and orientation in the position history, and the coordinates on the moving track. For example, since in the moving track information storage area 112, the moving track transmitted to the parent machine is stored, coordinates having a next number to the number (that is, identification information of each point on the moving track) corresponding to the current coordinates in the position history storage area 120 are obtained from the moving track information storage area 112, and the obtained coordinates may be regarded as the predicted position. The information indicative of the predicted coordinates of the applied child character 132 is stored in the predicted information storage area 122.

Thus, in this exemplary embodiment, even if the child machine misses the reception of the drawing information, a next position of the child character can be accurately predicted on the basis of the moving track information stored in the child machine. When the drawing information is received after the prediction, even if the position modification is performed in the above-described step S123, high accuracy of the predicted position allows the child character to smoothly move.

After completion of the process in the step S129, the process proceeds to the step S131. Also, if "NO" in the step S127, that is, the child character 132 of the child machine is not moved, the process directly proceeds to the step S131.

In the step S131, the CPU core 42 predicts the positions of the rest of the characters from the position history stored in the storage area 120. That is, position prediction of the child character 132 which has not moved out of the child characters 132 to be operated by the child machine, the parent character 134, and child characters of other child machines are made on the basis of the current coordinates and orientation, and the previous coordinates and orientation stored in the position history. The information indicative of the predicted coordinates of each character is stored in the predicted information storage area 122. After completion of the step S131, the process proceeds to the step S133.

In the step S133, the CPU core 42 updates the position history in the storage area 120. More specifically, the current coordinates of each character stored in the position history storage area 120 is stored as previous coordinates. In addition, update of the current coordinates of each character is performed. If the drawing information is received, the coordinates of each character included in the drawing information is stored as current coordinates. On the other hand, if the prediction is performed, the predicted coordinates of each character stored in the predicted information storage area 122 are stored as the current coordinates.

If the step S133 is ended or, if "NO" is determined in the step S125, the CPU core 42 executes a screen generating process in the step S135. Thus, game screens displayed on FIG. 7 or FIG. 8 is generated and displayed on the LCDs 12 and 14. In a case that the drawing information is received from the parent machine, each character is arranged in the position and direction on the basis of the drawing information in the three-dimensional game space. In a case that the prediction is performed, each character is arranged in the position and orientation based on the predicted information in the three-dimensional game space. The position of the icon of each character on the map screen is also obtained from the position of the drawing information or the predicted information. It should be noted that the input trace on the map screen is drawn on the basis of the moving track information obtained in the storage area 112 of the child machine. However, it may be possible that the parent machine transmits to each child machine the drawing information including the moving track information corresponding to each child machine, and the input trace is also drawn on the basis of the drawing information.

In the step S137, the CPU core 42 determines whether or not the game is ended. For example, it is determined whether or not a game end instruction is transmitted from the parent machine. If "NO" in the step S137, the process returns to the step S83 in FIG. 12 to execute a game process in a next frame. On the other hand, if "YES" is determined in the step S137, the CPU core 42 executes a game end process not shown to end the main process of the child machine.

According to this exemplary embodiment, in the child machine, information indicative of a movement of the child character is obtained as a moving track by the player while the movement of the child character is controlled by the moving track in the parent machine, and therefore, and therefore, even if a communication delay occurs in transmission of the movement instructing information to the parent machine, the child character may not stop in the course of the movement. More specifically, the parent machine receives a moving track, that is, a route through which a child character will move to thereby collectively obtain movement instructing information by enough time in advance, and therefore, even if a communication delay occurs, it is possible to continue to move the child character, thus preventing the movement of the child character from being suspended in the course of movement. Accordingly, it is possible to progress the game by moving the character without making the player sense a communication delay.

Also, if a child machine misses reception of the drawing information to draw the game space in each child machine, the position of the child character can be predicted on the basis of the moving track information input in each child machine. By utilizing the moving track obtained in the child machine, the prediction of the position of the child character is scarcely missed. Therefore, eve if the reception of the drawing information is missed, it is possible to move the child character without making the player feel a communication delay.

Furthermore, in the child machine, the moving track of the child character is input by successive coordinates instructions on the touch panel 22. Thus, the player can operate the movement of the object with an intuitive operation.

It should be noted that in the above-described exemplary embodiment, the game apparatus 10 is a game console, but in another exemplary embodiment, the game apparatus 10 may be other types of computers, such as a personal computer, a hand-held information terminal, a hand-held telephone, etc.

Additionally, in each of the above-described exemplary embodiment, in the game apparatus 10, an input of the moving track is performed by the touch panel 22 as one example of a pointing device for an input of the moving track. However, in another exemplary embodiment, any pointing device which allows a position instruction on the screen, such as a mouse, a track pad, a tablet, etc. can be used. It should be noted that by displaying a mouse pointer on a screen for input as necessary, an input position is explicitly indicated. Furthermore, a button depressed state is regarded as an input state, and a button released state is regarded as a no-input state, and whereby, it is possible to determine the presence or absence of the input to the character by the pointing device.

In addition, in each of the above-described exemplary embodiments, the communication game system 200 comprises a parent machine which manages movements of a plurality of objects existing in the game space and a child machine. However, in another exemplary embodiment, the communication game system 200 may comprise a server computer and a game apparatus 10, and the server functions as a parent machine. It should be noted that a player and a parent object as an operational object do not exist in the server. More specifically, the server may perform a management process like obtaining moving track information from each game apparatus 10 as a terminal, managing a game space including a movement control of the plurality of objects, transmitting the drawing information to each of the game apparatuses 10.

Although certain exemplary embodiments have been described and illustrated in detail, it is clearly understood that the same is by way of illustration and example only and is not to be taken by way of limitation, the spirit and scope of the certain exemplary embodiments being limited only by the terms of the appended claims.

What is claimed is:

1. A communication game system including a management computer which controls movements of a plurality of objects appearing in a virtual game space and a game apparatus which is communicably connected with said management computer via a network, where the network is the Internet or a Wide Area Network, and has an operating device configured to receive player input to operate at least one object out of said plurality of objects as an object to be operated, wherein
said game apparatus comprises
a processor;
a memory coupled to said processor, said memory storing instructions that, when executed by said processor, control said processor to:
obtain a moving track of the object to be operated input by said operating device, and
transmit said moving track to said management computer via the network, and
said management computer comprises
a processor;
a memory coupled to said processor, said memory storing instructions that, when executed by said processor, control said processor to:
receive said moving track from said game apparatus via the network,
control movement of the object to be operated in said virtual game space by said moving track, and
transmit, to said game apparatus, drawing information to draw said virtual game space including said moved object, and
said processor of said game apparatus is further controlled to
receive said drawing information from said management computer via the network, and
generate and display a game screen including said object to be operated by said received drawing information.

2. A communication game system according to claim 1, wherein
said game apparatus processor is controlled to transmit input end information to said management computer when the input of said moving track from said operating device ceases, and
said management computer processor is further controlled to start movement of said object on the condition that said input end information is received.

3. A communication game system according to claim 1, wherein
said game apparatus processor is further controlled not to accept the input of said moving track when the number of points on the moving track is equal to or more than a first threshold value.

4. A communication game system according to claim 1, wherein
said game apparatus processor is further controlled to sequentially transmit said moving track every time that a length of said moving track is equal to or more than a threshold value while being obtained.

5. A communication game system according to claim 1, wherein
said game apparatus processor is further controlled to clear said obtained moving track of said object when a no-input state to said object to be operated is shifted to an input state thereto.

6. A communication game system according to claim 1, wherein
said game apparatus processor is further controlled to transmit clear information of said moving track of said object when a no-input state to said object to be operated is shifted to an input state thereto, and
said management computer processor clears the received moving track of said object when the clear information of said moving track of said object is received.

7. A communication game system according to claim 1, wherein
said game apparatus processor is further controlled to specify an object selected as said object to be operated out of the plurality of objects, and obtains a moving track of said object.

8. A communication game system according to claim 1, wherein
said operating device is a pointing device, and
said game apparatus processor is further controlled to obtain a plurality of coordinates continuously detected from the input by said pointing device as said moving track.

9. A communication game system according to claim 1, wherein
said management computer processor is further controlled to instruct an action of an object to be operated of said management computer by a player, and
said management computer processor is further controlled to control the movement of the object to be operated of said management computer on the basis of a movement instruction by said management computer processor.

10. A communication game system according to claim 1, wherein
said game apparatus processor is further controlled to predict at least a position of said object to be operated on the basis of said obtained moving track obtained when said drawing information transmission is not received for a definite period of time.

11. A communication game system according to claim 1, wherein information on individual points of the moving track is not sequentially transmitted and information on a plurality of points of the moving track is collectively transmitted so that movement of the moved object in the displayed game screen is not performed in real time.

12. A communication game system according to claim 1, wherein the management computer receives information of the moving track by enough advance time to prevent the movement of the object from being suspended even if a communication delay in the network occurs.

13. A communication game system according to claim 1, wherein: the game apparatus processor determines whether or not a number of track points obtained as the moving track is equal to or more than an upper limit in the number of points obtained as the moving track; and when the number of track points obtained as the moving track is equal to or more than the upper limit, the game processor does not accept input of the moving track.

14. A communication game system according to claim 1, wherein said game apparatus further performs sequentially transmitting said moving track every time that a length of said moving track is equal to or more than a fixed length while being obtained.

15. A game apparatus, which is communicably connected with a management computer via a network, where the network is the Internet or a Wide Area Network, and manages movements of a plurality of objects appearing in a virtual game space in a communication game system, comprising:
   a processor;
   a memory coupled to said processor, said memory storing instructions that, when executed by said processor, control said processor to:
   receive a player input to operate at least one object among said plurality of objects as an object to be operated,
   obtain a moving track of said input object to be operated,
   transmit said obtain moving track to said management computer via the network,
   receive, from said management computer via the network, drawing information to draw said virtual game space including said object moved by said moving track, and
   generate and display a game screen including said object to be operated by said received drawing information.

16. A non-transitory storage medium storing a game program of a game apparatus which is communicably connected with a management computer via a network, where the network is the Internet or a Wide Area Network, managing movements of a plurality of objects appearing in a virtual game space in a communication game system, and has an operating device which is configured to receive a player operation to operate at least one object among said plurality of objects as an object to be operated, wherein
   said game program makes said game apparatus at least execute
      obtaining a moving track of said object to be operated input by said operating device,
      transmitting said obtained moving track to said management computer via the network,
      receiving drawing information to draw said virtual game space including said object moved by said moving track from said management computer via the network, and
      generating and displaying a game screen including said object to be operated by said received drawing information.

17. A management computer which is communicably connected with a game apparatus via a network, where the network is the Internet or a Wide Area Network, and has an operating device which is configured to receive an input from a player to operate at least one object among a plurality of objects appearing in a virtual game space as an object to be operated in a communication game system, and manages movements of said plurality of objects, comprising:
   a processor;
   a memory coupled to said processor, said memory storing instructions that, when executed by said processor, control said processor to:
   receive a moving track of said object which is obtained and transmitted by said operating device of said game apparatus via the network,
   control a movement of said object to be operated in said virtual game space by said received moving track, and
   transmit drawing information to draw said virtual game space including said object moved by said movement controller to said game apparatus.

18. A non-transitory storage medium storing a game program of a management computer which is communicably connected with a game apparatus via a network, where the network is the Internet or a Wide Area Network, having an operating device configured to receive input from a player to operate at least one object among a plurality of objects appearing in a virtual game space as an object to be operated in a communication game system, and manages movements of said plurality of objects, wherein
   said game program makes said management computer at least perform
      receiving a moving track of said object which is obtained and transmitted by said operating device of said game apparatus,
      controlling a movement of said object to be operated in said virtual game space by said received moving track, and
      transmitting drawing information to draw said virtual game space including said moved object to said game apparatus via the network.

19. A non-transitory storage medium storing a game program for a communication game system including a plurality of game apparatuses which function as a parent machine managing movements of a plurality of objects appearing in a virtual game space and as a child machine having an operating device configured to receive input from a player to operate at least one object among said plurality of objects as an object to be operated, wherein
   said game program causes said game apparatus which works as said child machine to at least perform
      obtaining a moving track of said object to be operated input by said operating device,
      transmitting said obtained moving track,
      receiving from said parent machine, via a network, where the network is the Internet or a Wide Area Network, drawing information to draw said virtual game space including said object moved by said moving track, and
      generating and displaying a game screen including said object to be operated by said received drawing information, and
   said game program causes said game apparatus which works as said parent machine to perform
      receiving the moving track of said object transmitted from said child machine via the network,
      controlling a movement of said object to be operated in said virtual game space by said received moving track, and
      transmitting to said child machine, via the network, drawing information to draw said virtual game space including said moved object.

20. A non-transitory storage medium according to claim 19, wherein information on individual points of the moving track is not sequentially transmitted and information on a plurality of points of the moving track is collectively transmitted so that movement of the moved object in the displayed game screen is not performed in real time.

21. A non-transitory storage medium according to claim 19, wherein the parent machine receives information of the moving track by enough advance time to prevent the movement of the object from being suspended even if a communication delay in the network occurs.

22. A non-transitory storage medium according to claim 19, said child machine further performs determining whether or not a number of track points obtained as the moving track is equal to or more than an upper limit in the number of points obtained as the moving track; and when the number of track points obtained as the moving track is equal to or more than the upper limit, a processor of the child machine does not accept input of the moving track.

23. A non-transitory storage medium according to claim 19, wherein said game apparatus further performs sequentially transmitting said moving track every time that a length of said moving track is equal to or more than a fixed length while being obtained.

24. A non-transitory storage medium according to claim 19, wherein
said child machine transmits input end information to said parent machine when the input of said moving track from said operating device ceases, and
said parent machine starts movement of said object on the condition that said input end information is received.

25. A non-transitory storage medium according to claim 19, wherein
a processor of said child machine is controlled to not to accept the input of said moving track when the number of points on the moving track is equal to or more than a first threshold value.

26. A non-transitory storage medium according to claim 19, wherein
said child machine sequentially transmits said moving track every time that a length of said moving track is equal to or more than a threshold value while being obtained.

27. A non-transitory storage medium according to claim 19, wherein
said child machine predicts at least a position of said object to be operated on the basis of said obtained moving track obtained when said drawing information transmission is not received for a definite period of time.

28. A communication game control method of a game apparatus which is communicably connected via a network, where the network is the Internet or a Wide Area Network, with a management computer managing the movements of a plurality of objects appearing in a virtual game space in a communication game system, and has an operating device configured to receive input from a player to operate at least one object out of said plurality of objects as an object to be operated, including:
obtaining a moving track of said object to be operated input by said operating device,
transmitting said obtained moving track to said management computer via the network,
receiving drawing information to draw said virtual game space including said object moved by said moving track from said management computer via the network, and
generating and displaying a game screen including said object to be operated by said received drawing information.

29. A communication game control method of a management computer which is communicably connected via a network, where the network is the Internet or a Wide Area Network, with a game apparatus having an operating device configured to receive input from a player to operate at least one object among a plurality of objects appearing in a virtual game space as an object to be operated in a communication game system, and manages movements of said plurality of objects, including:
receiving a moving track of said object which is obtained and transmitted by said operating device of said game apparatus via the network,
controlling a movement of said object to be operated in said virtual game space by said received moving track, and
transmitting drawing information to draw said virtual game space including said moved object to said game apparatus.

30. A communication game control method of a game apparatus in a communication game system including a plurality of game apparatuses which function as a parent machine managing movements of a plurality of objects appearing in a virtual game space and as a child machine having an operating device configured to receive input from a player to operate at least one object among said plurality of objects as an object to be operated, including:
if said game apparatus is set as said child machine,
obtaining a moving track of said object to be operated input by said operating device,
transmitting said obtained moving track to said parent machine via a network, where the network is the Internet or a Wide Area Network,
receiving from said parent machine, via the network, drawing information to draw said virtual game space including said moved object, and
generating and displaying a game screen including said object to be operated by said received drawing information, and
if said game apparatus is set as said parent machine,
receiving the moving track of said object transmitted from said child machine via the network,
controlling a movement of said object to be operated in said virtual game space by said received moving track, and
transmitting to said child machine drawing information to draw said virtual game space including said moved object.

* * * * *